(12) United States Patent
Matsuo et al.

(10) Patent No.: US 9,609,318 B2
(45) Date of Patent: Mar. 28, 2017

(54) VIDEO ENCODING METHOD, VIDEO DECODING METHOD, VIDEO ENCODING APPARATUS, VIDEO DECODING APPARATUS, AND PROGRAMS THEREOF

(75) Inventors: Shohei Matsuo, Yokosuka (JP); Yukihiro Bandoh, Yokosuka (JP); Seishi Takamura, Yokosuka (JP); Hirohisa Jozawa, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 326 days.

(21) Appl. No.: 13/814,144

(22) PCT Filed: Aug. 10, 2011

(86) PCT No.: PCT/JP2011/068286
§ 371 (c)(1),
(2), (4) Date: Feb. 4, 2013

(87) PCT Pub. No.: WO2012/020800
PCT Pub. Date: Feb. 16, 2012

(65) Prior Publication Data
US 2013/0128984 A1 May 23, 2013

(30) Foreign Application Priority Data
Aug. 12, 2010 (JP) ................................. 2010-180813

(51) Int. Cl.
*H04N 7/26* (2006.01)
*H04N 19/50* (2014.01)
(Continued)

(52) U.S. Cl.
CPC ..... *H04N 19/00569* (2013.01); *H04N 19/117* (2014.11); *H04N 19/119* (2014.11);
(Continued)

(58) Field of Classification Search
CPC ..................................................... H04N 19/59
See application file for complete search history.

(56) References Cited

U.S. PATENT DOCUMENTS

2001/0012405 A1 8/2001 Hagai et al.
2008/0304569 A1 12/2008 Lee et al.
(Continued)

FOREIGN PATENT DOCUMENTS

CN 101529918 A 9/2009
CN 101641960 A 2/2010
(Continued)

OTHER PUBLICATIONS

Lie, Wen-Nung, et al., "Multi-spectral Satellite Image Compression Based on Multi-Mode Linear Prediction," Proc. of SPIE, Visual Communications and Image Processing, Jun. 2000, pp. 848-855.
(Continued)

*Primary Examiner* — Frederick Bailey
(74) *Attorney, Agent, or Firm* — Harness, Dickey & Pierce, P.L.C.

(57) ABSTRACT

A reduction in residual energy of inter-frame prediction with motion compensation and improvement in encoding efficiency are achieved by using a region-dividing type adaptive interpolation filter that takes an edge property of a picture into consideration. An edge calculation unit calculates edge information from reference picture data designated by a motion vector. A region dividing unit divides an encoding target frame into a plurality of regions that are units to which interpolation filters are adaptively applied based on the edge information. A filter coefficient optimizing unit optimizes an interpolation filter for a fractional-accuracy pixel for each of the regions. A reference picture interpolating unit interpolates the fractional-accuracy pixel of a reference picture using the optimized interpolation filter, and a predictive
(Continued)

encoding unit performs predictive encoding using motion compensation of fractional-accuracy.

6 Claims, 19 Drawing Sheets

(51) Int. Cl.
*H04N 19/117* (2014.01)
*H04N 19/14* (2014.01)
*H04N 19/523* (2014.01)
*H04N 19/59* (2014.01)
*H04N 19/176* (2014.01)
*H04N 19/119* (2014.01)

(52) U.S. Cl.
CPC .......... *H04N 19/14* (2014.11); *H04N 19/176* (2014.11); *H04N 19/523* (2014.11); *H04N 19/59* (2014.11)

(56) References Cited

U.S. PATENT DOCUMENTS

| | | | | |
|---|---|---|---|---|
| 2009/0208129 A1* | 8/2009 | Shimodaira | .................... | 382/264 |
| 2010/0034476 A1* | 2/2010 | Kido | .................... | G06K 9/6857 382/243 |
| 2010/0208802 A1* | 8/2010 | Tsukuba | ........... | H04N 19/00763 375/240.12 |
| 2012/0033728 A1* | 2/2012 | Cho et al. | ................ | 375/240.03 |

FOREIGN PATENT DOCUMENTS

| | | | |
|---|---|---|---|
| EP | 2086239 | A2 | 8/2009 |
| JP | 2003-319398 | A | 11/2003 |
| JP | 2008-054267 | A | 3/2008 |
| KR | 10-2009-0081878 | A | 7/2009 |
| WO | WO-2008/069073 | A1 | 6/2008 |
| WO | WO2009131508 | * | 10/2009 |
| WO | WO-2010/021108 | A1 | 2/2010 |
| WO | WO2010087620 | * | 7/2010 |

OTHER PUBLICATIONS

Office Action, Taiwanese Patent Application No. 100128829, Oct. 28, 2014.
Hiroshi Harashima, et al., "Video Information Encoding", Ohmsha, Ltd., pp. 135-136, 2001.
Sakae Okubo, et al., "H.264/AVC Textbook: 3rd Revised Edition", Impress R&D, pp. 119-123, 2009.
I. E. G. Richardson and G. J. Sullivan: "H.264 and MPEG-4 Video Compression", Wiley, pp. 172-175, 2003.
Y. Vatis, et al., "Motion-and aliasing-compensated prediction using a two-dimensional non-separable adaptive Wiener interpolation filter", Proc. ICIP2005, IEEE International Conference on Image Processing, pp. II 894-897, Genova, Italy, Sep. 2005.
S. Wittmann, T. Wedi: "Separable adaptive interpolation filter for video coding", Proc. ICIP2008, IEEE International Conference on Image Processing, pp. 2500-2503, San Diego, California.
Shohei Matsuo, et al., "Separable adaptive interpolation filter with region dividing technique for motion compensation", The Institute of Electronics, Information and Communication Engineers, Technical Committee on Image Engineering, pp. 113-116, Nov. 2009.
Kai Zhang, et al., Single-Pass Encoding Using Multiple Adaptive Interpolation Filters, ITU-Telecommunications Standardization Sector Study Group 16 Question 6 Video Coding Experts Group.
Shohei Matsuo, et al., Region-based adaptive interpolation filter, JCTVC-B051 (Joint Collaborative Team on Video Coding (JCT-VC) of ITU-T SG16 WP3 and ISO/IEC JTC1/SC29/WG11), JCTVC-B051, Jul. 7, 2010.
Ronggang Wang, et al., Partition-level adaptive interpolation filter for video coding, Multimedia and Expo, 2009. IEEE International Conference on, Jul. 3, 2009, p. 157-160.
International Search Report for PCT/JP2011/068286, ISA/JP, mailed Sep. 27, 2011, in Japanese and English.
Notice of Non-Final Rejection, Korean Patent Application No. 10-2013-7001194, Jan. 24, 2014.
First Office Action, Chinese Patent Application No. 201180035072.4, May 4, 2015.
Notice of Non-Final Rejection, Korean Patent Application No. 10-2013-7001194, Jul. 3, 2015.
OA-1 Search Report for parallel application EP 11816464.9, EPO, Munich, mailed Oct. 6, 2016.

* cited by examiner

| REGION | DEFINITION |
|---|---|
| 1 | $-1 \leq E \leq 1$ |
| 2 | $E < -1, 1 < E$ |

| REGION | DEFINITION |
|---|---|
| 1 | $-0.414 \leq E < 0.414$ |
| 2 | $0.414 \leq E < 2.414$ |
| 3 | $2.414 \leq E,\ E < -2.414$ |
| 4 | $-2.414 \leq E < -0.414$ |

| REGION | DEFINITION |
|---|---|
| 1 | $-1 \leq E \leq 1$ AND $Z_t < Z$ |
| 2 | $E < -1, 1 < E$ AND $Z_t < Z$ |
| 3 | $Z \leq Z_t$ |

| REGION | DEFINITION |
|---|---|
| 1 | $-0.414 \leq E < 0.414$ AND $Z_t < Z$ |
| 2 | $0.414 \leq E < 2.414$ AND $Z_t < Z$ |
| 3 | $2.414 \leq E, E < -2.414$ AND $Z_t < Z$ |
| 4 | $-2.414 \leq E < -0.414$ AND $Z_t < Z$ |
| 5 | $Z \leq Z_t$ |

$[f_{b1}, f_{b2}, f_{b3}, f_{b4}] = [-2, 6, -12, 40]/64$

● : INTEGER-ACCURACY PIXEL
○ : INTERPOLATED PIXEL $[f_{c1}, f_{c2}, f_{c3}] = [1, -5, 20]/32$

● : INTEGER-ACCURACY PIXEL
○ : INTERPOLATED PIXEL

VIDEO ENCODING METHOD, VIDEO DECODING METHOD, VIDEO ENCODING APPARATUS, VIDEO DECODING APPARATUS, AND PROGRAMS THEREOF

CROSS-REFERENCE TO RELATED APPLICATIONS

This application is a 371 U.S. National Stage of International Application No. PCT/JP2011/068286, filed Aug. 10, 2011. Priority is claimed on Japanese Patent Application No. 2010-180813, filed Aug. 12, 2010, the content of which is incorporated herein by reference.

TECHNICAL FIELD

The present invention relates to video encoding and video decoding technologies that achieve improvement in performance of an adaptive interpolation filter in video encoding using motion compensation.

BACKGROUND ART

In video encoding, in the case of inter-frame prediction (motion compensation) encoding which performs prediction between different frames, a motion vector is obtained by referring to an already decoded frame so as to minimize the prediction error energy and the like, a residual signal is subjected to orthogonal transform, quantization is applied, and entropy encoding is performed, thereby binary data is obtained. In order to increase the encoding efficiency, a prediction scheme that provides higher prediction accuracy is required, and it is indispensable to reduce the prediction error energy.

A great number of tools that increase the accuracy of inter-frame prediction have been introduced into video encoding standards. For example, if there is occlusion in a nearest frame, the prediction error energy can be further reduced by referring to a frame that is distant in the time domain to some extent, and thus, in H.264/AVC, a plurality of frames can be referred to. This tool is called multiple reference frame prediction.

In addition, in order to deal with motions having complex shapes, a block size can be subdivided, such as 16×8, 8×16, 8×4, 4×8, and 4×4, in addition to 16×16 and 8×8. This tool is called variable block size prediction.

Similar to these, pixels of ½ accuracy are interpolated from integer-accuracy pixels of a reference frame using a 6-tap filter, and then pixels of ¼ accuracy are generated by linear interpolation using these pixels. Accordingly, it becomes possible to realize accurate prediction for motions of non-integer accuracy. This tool is called ¼ pixel accuracy prediction.

In order to develop next-generation video coding standards that provide higher encoding efficiency than that of the H.264/AVC, various proposals are now gathering from all over the world to the international organization for standardization ISO/IEC "MPEG" (International Organization for Standardization/International Electrotechnical Commission "Moving Picture Experts Group") and ITU-T "VCEG" (International Telecommunication Union-Telecommunication Standardization Sector "Video Coding Experts Group"). Among them, in particular, many proposals relating to inter-frame prediction (motion compensation) have been presented, and software for next-generation video coding that is being drawn up under the leadership of the VCEG (hereinafter referred to as KTA (Key Technical Area) software) employs a tool for reducing the bit-rates of motion vectors, a tool for extending the block size to 16×16 or larger, and the like.

In particular, a tool for adaptively changing interpolation filter coefficients for a fractional-accuracy pixel is called an adaptive interpolation filter, it is effective for almost all the pictures, and it was first adopted in the KTA software. This technology is also employed in a lot of contributions to an invitation (call for proposal) for a next-generation video encoding test model issued by the group JCT-VC (Joint Collaborative Team on Video Coding), which is being jointly promoted by the MPEG and the VCEG for development of next-generation video coding standards. Because of a high contribution to improvement in encoding efficiency, improvement in performance of adaptive interpolation filters is a very expectative field in the future.

Although the current situation is as described above, conventionally, the following filters have been used as interpolation filters in video coding.

[Fixed Interpolation]

In the conventional video coding standards MPEG-1/2, as shown in FIG. 15A, in order to interpolate a pixel of ½ accuracy, an interpolated pixel is generated by averaging from two adjacent integer-accuracy pixels (also just called integer pixels). That is, a mean filter of [½, ½] is applied to the two integer pixels. Because it is a very simple process, it is effective from viewpoint of the computational complexity, but the performance of the filter is not high for the purpose of obtaining a pixel of ¼ accuracy.

In the MPEG-4 Part 2, a pixel of ½ pixel accuracy is generated using a mean filter in a similar manner, but the advanced simple profile (ASP) also supports motion compensation of ¼ pixel accuracy. The position of a ½ pixel is calculated using a one-dimensional 8-tap filter as shown in FIG. 15B. Thereafter, the position of a ¼ pixel is derived using a mean filter.

Moreover, in the H.264/AVC, as shown in FIG. 15C, when the position of a ½ pixel is to be interpolated, interpolation is performed using 6 integer pixels including three points on the left side of the pixel to be interpolated and three points on the right side of the pixel to be interpolated. With respect to the vertical direction, interpolation is performed using 6 integer pixels including three points on the upper side and three points on the lower side. The filter coefficients are [(1, −5, 20, 20, −5, 1)/32]. After the positions of ½ pixels have been interpolated, the positions of ¼ pixels are interpolated using a mean filter of [½, ½]. Since it is necessary to interpolate the positions of all the ½ pixels, the computational complexity is high, but high-performance interpolation is possible, so that the encoding efficiency is improved. Non-Patent Document 1, Non-Patent Document 2, and Non-Patent Document 3 disclose the details of the above fixed interpolation filter.

[Adaptive Interpolation]

In the H.264/AVC, the values of filter coefficients are constant, irrespective of conditions of an input picture (the type of a sequence, the size of a picture, and a frame rate) and encoding conditions (the block size, the structure of a GOP (group of pictures), and QP (quantization parameters)). When the values of filter coefficients are fixed, for example, effects that vary over time, such as aliasing, a quantization error, an error resulting from motion estimation, camera noise, are not taken into consideration. Therefore, it is considered that improvement in performance is limited in terms of the encoding efficiency. Accordingly, Non-Patent Document 4 proposes a scheme of adaptively changing interpolation filter coefficients, which is called a non-separable adaptive interpolation filter.

In Non-Patent Document 4, a two-dimensional interpolation filter (6×6=36 filter coefficients) is intended, and the filter coefficients are determined so as to minimize the prediction error energy. Although it is possible to realize higher encoding efficiency than that obtained by using a one-dimensional 6-tap fixed interpolation filter employed in the H.264/AVC, the computational complexity for obtaining filter coefficients is very high, and thus Non-Patent Document 5 introduces a proposal for reducing the computational complexity.

The technique introduced in the Non-Patent Document 5 is called a separable adaptive interpolation filter (SAIF), and it uses a one-dimensional 6-tap interpolation filter rather than a two-dimensional interpolation filter.

FIG. 16A to FIG. 16C are diagrams illustrating a method for interpolating a pixel of non-integer accuracy in the separable adaptive interpolation filter (SAIF). Its procedure is such that, first, as shown by step 1 in FIG. 16B, pixels in the horizontal direction (a, b, and c) are interpolated. Integer-accuracy pixels C1 to C6 are used for determining filter coefficients. Filter coefficients in the horizontal direction that minimize a prediction error energy function $E_h^2$ of Equation (1) are analytically determined by the commonly known least square method (see Non-Patent Document 4).

[Equation 1]

$$E_h^2 = \sum_{x,y}\left(S_{x,y} - \sum_{ci} w_{ci} \cdot P_{\tilde{x}+c_i,\tilde{y}}\right)^2 \quad (1)$$

Here, S denotes an original picture, P denotes a decoded reference picture, x and y respective denote positions in the horizontal and the vertical direction in a picture. Moreover, ~x (~ is a symbol placed above x; the others are also the same) satisfies ~x=x+$MV_x$–FilterOffset, where $MV_x$ denotes the horizontal component of a motion vector that has been obtained beforehand, and FilterOffset denotes an offset for adjustment (the value obtained by dividing a filter length in the horizontal direction by 2). With respect to the vertical direction, ~y=y+$MV_y$ is satisfied, where $MV_y$ denotes the vertical component of the motion vector. $w_{ci}$ denotes a group of filter coefficients in the horizontal direction $c_i$ (0≤$c_i$<6) that is to be determined.

Linear equations, the number of which being equal to the number of filter coefficients determined by Equation (1), are obtained, and minimizing processes are performed for fractional pixel positions in the horizontal direction independently of one another. Through the minimizing processes, three groups of 6-tap filter coefficients are obtained, and fractional-accuracy pixels a, b, and c are interpolated using these filter coefficients.

After the interpolation of the pixels in the horizontal direction has been completed, as shown by step 2 in FIG. 16C, an interpolation process in the vertical direction is performed. Filter coefficients in the vertical direction are determined by solving the linear problem similar to that in the horizontal direction. Specifically, filter coefficients in the vertical direction that minimize a prediction error energy function $E_v^2$ of Equation (2) are analytically determined.

[Equation 2]

$$E_v^2 = \sum_{x,y}\left(S_{x,y} - \sum_{cj} w_{cj} \cdot \hat{P}_{\tilde{x},\tilde{y}+c_j}\right)^2 \quad (2)$$

Here, S denotes an original picture, ^P (^ is a symbol placed above P) denotes a picture which has been decoded and then interpolated in the horizontal direction, and x and y respectively denote positions in the horizontal direction and the vertical direction in a picture. Moreover, ~x is represented as 4·(x+$MV_x$), where $MV_x$ denotes the horizontal component of a motion vector that has been rounded off to the nearest whole number. With respect to the vertical direction, ~y is represented as y+$MV_y$–FilterOffset, where $MV_y$ denotes the vertical component of the motion vector, and FilterOffset denotes an offset for adjustment (the value obtained by dividing a filter length by 2). $w_{cj}$ denotes a group of filter coefficients in the vertical direction $c_j$ (0≤$c_j$<6) that is to be determined.

Minimizing processes are performed for fractional-accuracy pixels independently of one another, and 12 groups of 6-tap filter coefficients are obtained. The remaining fractional-accuracy pixels are interpolated using these filter coefficients.

As stated above, it is necessary to encode 90 (=6×15) filter coefficients and transmit them to a decoding end. In particular, since the overhead becomes large in low resolution encoding, filter coefficients to be transmitted are reduced using the symmetry of a filter. For example, in FIG. 16A, b, h, i, j, and k are positioned at the centers of integer-accuracy pixels, and with respect to the horizontal direction, coefficients obtained by inverting coefficients used for three points on the left side can be applied to three points on the right side. Similarly, with respect to the vertical direction, coefficients obtained by inverting coefficients used for three points on the upper side can be applied to three points on the lower side ($c_1$=$c_6$, $c_2$=$c_5$, and $c_3$=$c_4$).

Additionally, since the relationship between d and l is symmetric about h, inverted filter coefficients can be used. That is, by transmitting 6 coefficients for d, their values can also be applied to l. $c(d)_1$=$c(l)_6$, $c(d)_2$=$c(l)_5$, $c(d)_3$=$c(l)_4$, $c(d)_4$=$c(l)_3$, $c(d)_5$=$c(l)_2$, and $c(d)_6$=$c(l)_1$ are satisfied. This symmetry is also used for e and m, f and n, and g and o. Although the same theory holds for a and c, since the result for the horizontal direction interpolation affects interpolation in the vertical direction, a and c are transmitted separately without using symmetry. With the use of the symmetry described above, the number of filter coefficients to be transmitted for each frame becomes 51 (15 for the horizontal direction and 36 for the vertical direction).

In the above adaptive interpolation filter of Non-Patent Document 5, the processing unit of the minimization of the prediction error energy is fixed to a frame. 51 filter coefficients are determined per one frame. If an encoding target frame is roughly divided into two types (or a plurality of types) of texture regions, the optimum filter coefficients are a group of coefficients in which both of them (all the textures) are taken into consideration. Under the situation in which characteristic filter coefficients are essentially obtained only in the vertical direction with respect to a region A and filter coefficients are obtained only in the horizontal direction with respect to a region B, filter coefficients are derived as the average of both of them.

Non-Patent Document 6 proposes a method for achieving a reduction in prediction error energy and realizing improvement in encoding efficiency by preparing a plurality of groups of filter coefficients and perform switching therebetween in accordance with local characteristics of a picture, without being limited to one group of filter coefficients (51 coefficients) per one frame.

As shown in FIG. 17A and FIG. 17B, it is assumed the case in which an encoding target frame includes textures having different properties. As shown in FIG. 17A, when one group of the optimized filter coefficients are transmitted for the entire frame, the properties of all the textures are taken into consideration. If the textures are not so much different from one another, it is considered that the filter coefficients obtained by optimizing its entirety are best; however, if the textures have properties that are opposite to one another, it is possible to further reduce the bit-rates of the entire frame by using filter coefficients that have been optimized for each texture as shown in FIG. 17B. For this reason, Non-Patent Document 6 proposes a method using, for one frame, a plurality of groups of filter coefficients that have been optimized by using division into regions.

As a technique of the division into regions, Non-Patent Document 6 employs a motion vector (the horizontal component, the vertical component, and the direction), spatial coordinates (the position of a macroblock, and the x coordinate and the y coordinate of a block), and the like, and performs the division into regions taking various properties of a picture into consideration.

FIG. 18 illustrates an example of a configuration of a video encoding apparatus using a conventional region-dividing type adaptive interpolation filter as disclosed in Non-Patent Document 6.

In a video encoding apparatus 100, a region dividing unit 101 divides an encoding target frame of an input video signal into a plurality of regions which are a plurality of blocks serving as units for adaptively switching interpolation filter coefficients. An interpolation filter coefficient switching unit 102 switches interpolation filter coefficients for a fractional-accuracy pixel used for a reference picture in predictive encoding, for each of the regions divided by the region dividing unit 101. For example, as the interpolation filter coefficients to be switched, filter coefficients optimized by a filter coefficient optimizing unit 1021 are used. The filter coefficient optimizing unit 1021 calculates interpolation filter coefficients that minimize the prediction error energy between an original picture and an interpolated reference picture for each of the regions.

A prediction signal generating unit 103 is provided with a reference picture interpolating unit 1031 and a motion detecting unit 1032. The reference picture interpolating unit 1031 applies an interpolation filter using the interpolation filter coefficients selected by the interpolation filter coefficient switching unit 102 to a decoded reference picture stored in a reference picture memory 107. The motion detecting unit 1032 performs a motion search on the interpolated reference picture to calculate a motion vector. The prediction signal generating unit 103 generates a predicted signal by motion compensation using the motion vector of fractional-accuracy calculated by the motion detecting unit 1032.

A predictive encoding unit 104 calculates a residual signal between the input video signal and the predicted signal, performs orthogonal transform on the residual signal, and quantizes transform coefficients, thereby performing predictive encoding. Moreover, a decoding unit 106 performs decoding on the result of the predictive encoding, and stores a decoded signal in the reference picture memory 107 for the subsequent predictive encoding.

A variable-length encoding unit 105 performs variable-length encoding on the quantized transform coefficients and the motion vector, performs variable-length encoding on the interpolation filter coefficients selected by the interpolation filter coefficient switching unit 102 for each of the regions, and outputs them as an encoded bitstream.

FIG. 19 illustrates an example of a configuration of a video decoding apparatus using the conventional region-dividing type adaptive interpolation filter. The bitstream encoded by the video encoding apparatus 100 shown in FIG. 18 is decoded by a video decoding apparatus 200 shown in FIG. 19.

In the video decoding apparatus 200, a variable-length decoding unit 201 inputs the encoded bitstream, and decodes the quantized transform coefficients, the motion vector, groups of the interpolation filter coefficients, and the like. A region determining unit 202 determines regions that are units for adaptively switching interpolation filter coefficients for a decoding target frame. An interpolation filter coefficient switching unit 203 switches the interpolation filter coefficients decoded by the variable-length decoding unit 201 for each of the regions determined by the region determining unit 202.

A reference picture interpolating unit 2041 in a prediction signal generating unit 204 applies an interpolation filter using interpolation filter coefficients received from the interpolation filter coefficient switching unit 203 to a decoded reference picture stored in a reference picture memory 206, to restore pixels of fractional-accuracy of the reference picture. The prediction signal generating unit 204 generates a predicted signal of a decoding target block from a reference picture for which the pixels of fractional-accuracy have been restored.

A predictive decoding unit 205 performs inverse quantization on the quantization coefficients decoded by the variable-length decoding unit 201, inverse orthogonal transform, and the like, and sums the calculated prediction residual signal and the predicted signal generated by the prediction signal generating unit 204 to generate a decoded signal, and outputs it as a decoded picture. In addition, the decoded signal decoded by the predictive decoding unit 205 is stored in the reference picture memory 206 for the subsequent predictive decoding.

PRIOR ART DOCUMENTS

Non-Patent Documents

Non-Patent Document 1: Hiroshi Harashima, Yoshinori Sakai, and Toshiyuki Yoshida: "Video Information Encoding", Ohmsha, Ltd., pp. 135-136, 2001

Non-Patent Document 2: Sakae Okubo, Shinya Kadono, Yoshihiro Kikuchi, and Teruhiko Suzuki, "H.264/AVC Textbook: 3rd Revised Edition", Impress R&D, pp. 119-123, 2009

Non-Patent Document 3: I. E. G. Richardson and G. J. Sullivan: "H.264 and MPEG-4 VIDEO COMPRESSION", WILEY, pp. 172-175, 2003

Non-Patent Document 4: Y. Vatis, B. Edler, and D. T. Nguyen, J. Ostermann: "Motion- and aliasing-compensated prediction using a two-dimensional non-separable adaptive Wiener interpolation filter", Proc. ICIP2005, IEEE International Conference on Image Processing, pp. II 894-897, Genova, Italy, September 2005

Non-Patent Document 5: S. Wittmann, T. Wedi: "Separable adaptive interpolation filter for video coding", Proc.

ICIP2008, IEEE International Conference on Image Processing, pp. 2500-2503, San Diego, Calif., USA, October 2008

Non-Patent Document 6: Shohei Matsuo, Seishi Takamura, and Hirohisa Jozawa, "Separable adaptive interpolation filter with region dividing technique for motion compensation", The Institute of Electronics, Information and Communication Engineers, Technical Committee on Image Engineering, pp. 113-116, November 2009

SUMMARY OF INVENTION

Problems to be Solved by the Invention

The region-dividing type adaptive interpolation filter (Non-Patent Document 6) used by the video encoding apparatus 100 as shown in FIG. 18 performs switching between a plurality of groups of filter coefficients within a frame while taking local properties included in a picture into consideration to reduce the prediction error energy, and aims at improvement in encoding efficiency. However, motion vectors and spatial coordinates are focused in performing the division into regions, and texture components of a picture are not taken into consideration. Since it is considered that edge information included in a picture is one of important indexes indicating picture locality, it is contemplated that further improvement in encoding efficiency is expected by employing the edge information in the region-dividing technique.

In view of this point, an object of the present invention is to optimize filter coefficients, further reduce the residual energy, and thereby improve the encoding efficiency by performing the division into regions while treating edges of a reference picture as features.

Means for Solving the Problems

As a method for achieving the above object, based on the assumption that a reference picture designated by a motion vector includes texture information similar to that in an original picture, an edge component is calculated from the reference picture, and division into regions is performed. With this means, the texture information included in the picture can be used in the division into regions, and improvement in encoding efficiency is achieved as a result of a reduction in prediction error energy.

That is, the present invention is a video encoding method using motion compensation which acquires a reference picture designated by a motion vector, and calculates edge information from the acquired reference picture. Division into regions is performed within a frame from the calculated edge information, and interpolation filter coefficients for a fractional-accuracy pixel are optimized for each of the regions. Thereafter, the fractional-accuracy pixel is interpolated using an optimized interpolation filter, and encoding is performed.

In addition, the present invention is a video decoding method which performs decoding on an encoded stream encoded by the video encoding method to decode interpolation filter coefficients for a fractional-accuracy pixel, and calculates edge information from a reference picture obtained from a decoded motion vector. A region is determined using the calculated edge information, interpolation filters for the fractional-accuracy pixel are switched for each of the regions, the fractional-accuracy pixel is interpolated, and decoding is performed.

The operation of the present invention is as follows. The conventional region-dividing type adaptive interpolation filter employs a region-dividing technique that uses motion vectors and spatial coordinates, so that it is not possible to perform division into regions using texture information of a picture and picture locality has not been sufficiently taken into consideration. In contrast, the present invention can absorb influences caused by textures of a picture, make a region-dividing function flexible, and achieve improvement in encoding efficiency.

Advantageous Effects of the Invention

As described above, the present invention can realize division into regions using texture (edge) information, which was not able to be taken into consideration in conventional separable adaptive interpolation filters, provide a wide variety of types of division into regions, increase the flexibility in terms of locality within a frame, and achieve improvement in encoding efficiency as a result of a reduction in prediction error energy.

MODES FOR CARRYING OUT THE INVENTION

Hereinafter, embodiments of the present invention will be described with reference to the drawings.
[Video Encoding Apparatus]

Figure 1:
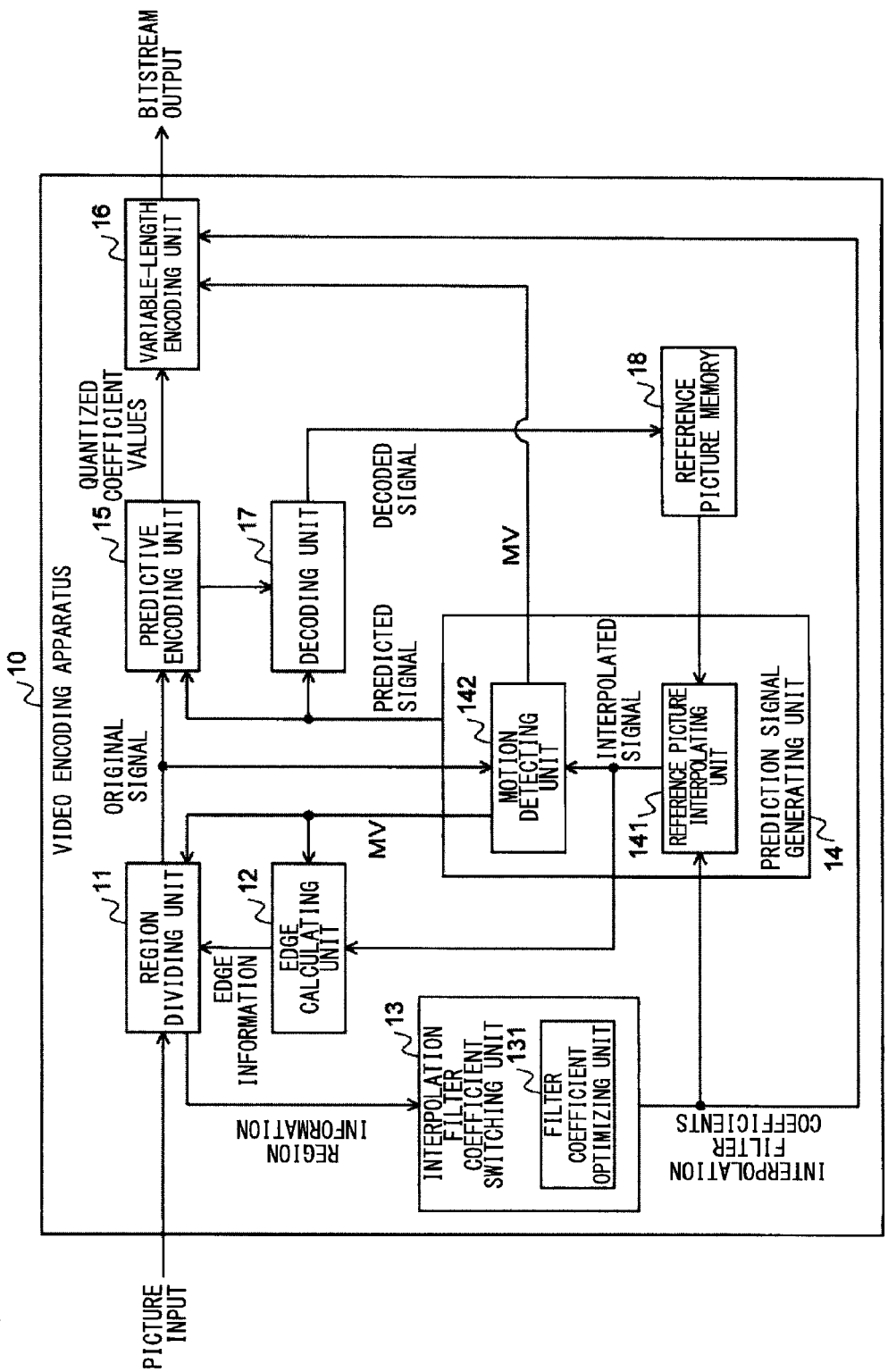
FIG. 1 is a diagram illustrating an example of a configuration of a video encoding apparatus.
Figure 18:
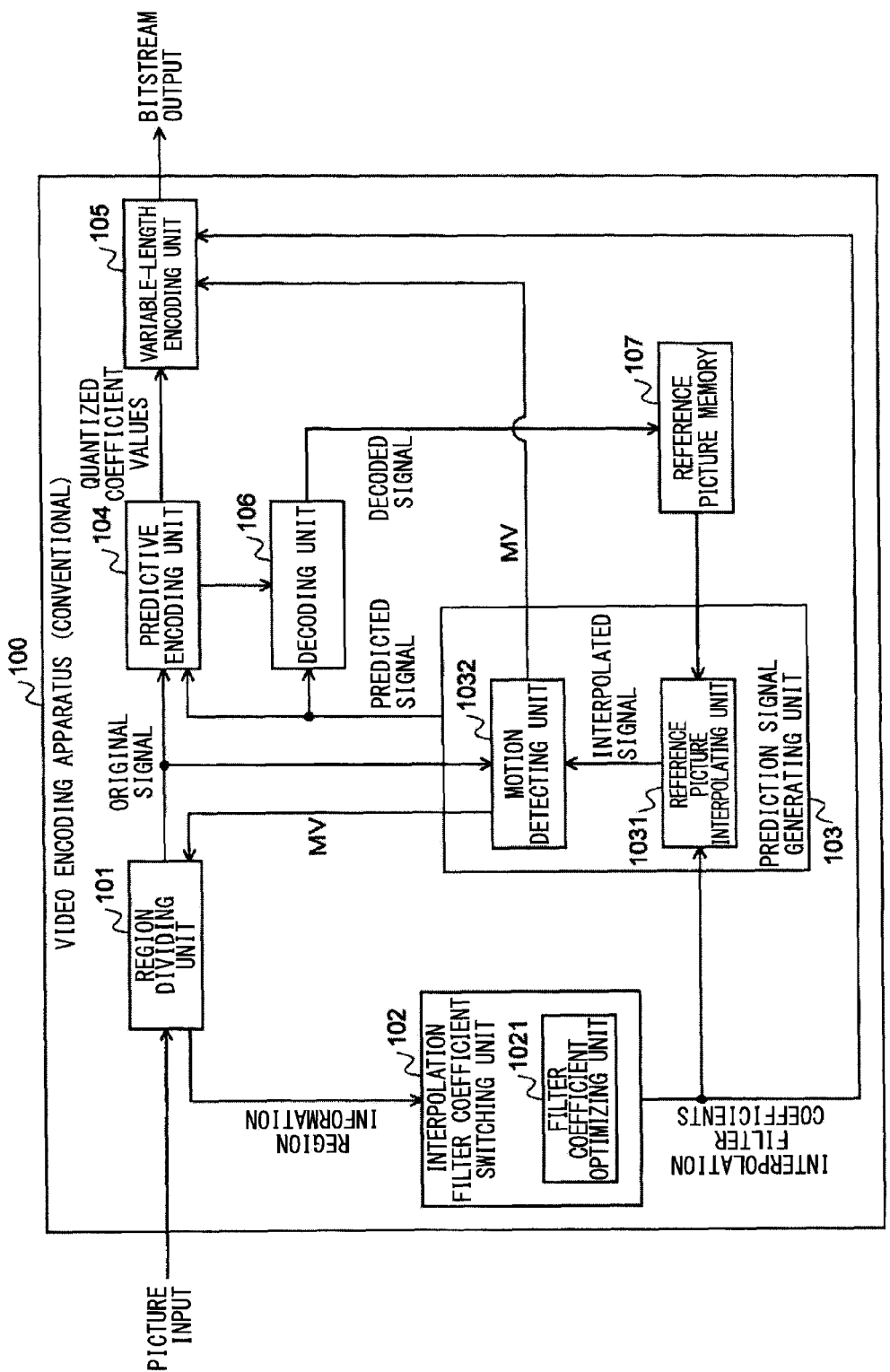
FIG. 18 is a diagram illustrating an example of a configuration of a video encoding apparatus using a conventional region-dividing type adaptive interpolation filter.

FIG. 1 is a diagram illustrating an example of a configuration of a video encoding apparatus in accordance with the present invention. A video encoding apparatus 10 is an apparatus which interpolates fractional-accuracy pixels using a region-dividing type adaptive interpolation filter that utilizes edge information and performs encoding with motion compensation of fractional-accuracy, and it is different from the conventional video encoding apparatus 100 shown in FIG. 18 in that division into regions that serve as units for switching adaptive interpolation filters is performed using the edge information detected from a reference picture.

In the video encoding apparatus 10, a region dividing unit 11 divides an encoding target frame of an input video signal into a plurality of regions which are a plurality of blocks serving as units for adaptively switching interpolation filter coefficients using edge information calculated by an edge calculating unit 12. The edge calculating unit 12 extracts the edge information from the reference picture in motion compensation. The details thereof will be described later.

An interpolation filter coefficient switching unit 13 switches interpolation filter coefficients for a fractional-accuracy pixel which are used for a reference picture in predictive encoding for each of the regions divided by the region dividing unit 11. For example, as the interpolation filter coefficients to be switched, filter coefficients optimized by a filter coefficient optimizing unit 131 are used. The filter coefficient optimizing unit 131 calculates, for each of the regions, interpolation filter coefficients that minimize the prediction error energy between an original picture and an interpolated reference picture.

A prediction signal generating unit 14 is provided with a reference picture interpolating unit 141 and a motion detecting unit 142. The reference picture interpolating unit 141 applies an interpolation filter using interpolation filter coefficients selected by the interpolation filter coefficient switching unit 13 to a decoded reference picture stored in a reference picture memory 18. The motion detecting unit 142 performs a motion search on the interpolated reference picture to calculate a motion vector MV. The prediction signal generating unit 14 performs motion compensation using the motion vector of fractional-accuracy calculated by the motion detecting unit 142 to generate a predicted signal.

A predictive encoding unit 15 performs predictive encoding by, for example, calculating a residual signal between the input video signal and the predicted signal, performing orthogonal transform thereon, and quantizing transform coefficients. In addition, a decoding unit 17 performs decoding on the result of the predictive encoding and stores a decoded signal in the reference picture memory 18 for the subsequent predictive encoding.

A variable-length encoding unit 16 performs variable-length encoding on the quantized transform coefficients and the motion vector, performs, for each of the regions, variable-length encoding on the interpolation filter coefficients selected by the interpolation filter coefficient switching unit 13, and outputs them as an encoded bitstream.
[Processing Flow of Video Encoding Apparatus]

Figure 2:
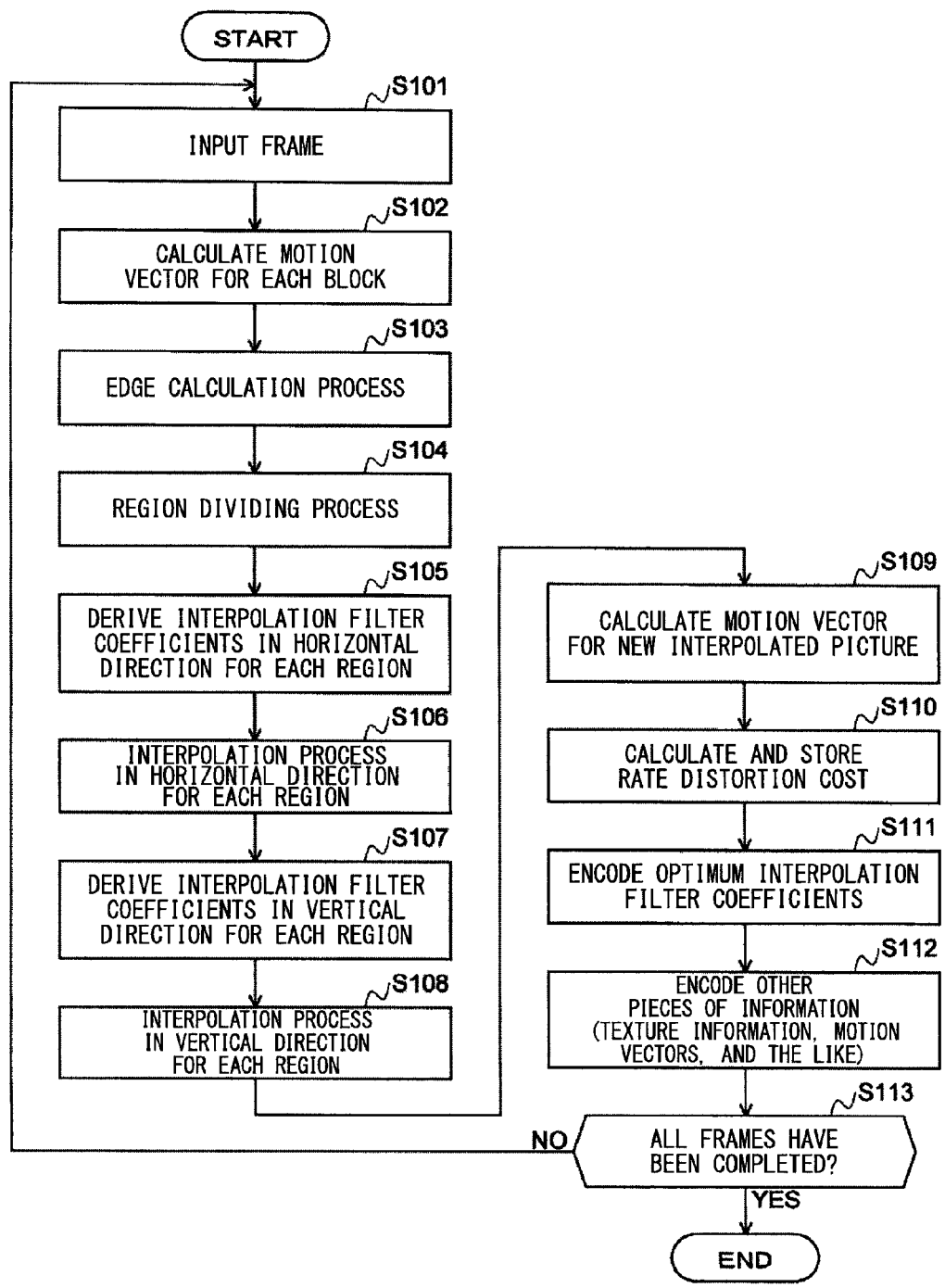
FIG. 2 is a flowchart of a video encoding process.

FIG. 2 is a flowchart of a video encoding process executed by the video encoding apparatus 10. Hereinafter, unless otherwise specified, a description will be given assuming that luminance signals are processed; however, the function of dividing into regions using edge information of a picture and optimizing and encoding interpolation filter coefficients for each region described in the present example can be applied not only to luminance signals but also to chrominance signals.

First, in step S101, an encoding target frame is input. Next, in step S102, the input frame is divided into blocks (e.g., the block size in conventional motion prediction, such as 16×16 and 8×8), and the motion detecting unit 142 calculates the optimum motion vector for each of the blocks. A conventional fixed 6-tap filter in the H.264/AVC is used for interpolation of fractional-accuracy pixels of a reference picture in step S102.

Subsequently, in step S103, using the motion vector obtained in step S102, the edge calculating unit 12 acquires a reference picture designated by the motion vector and calculates edge information. Generally known edge detection technique (e.g., a Sobel filter) is used for the calculation of the edge information.

Subsequently, in step S104, the region dividing unit 11 determines a region for each of the blocks using the edge information obtained in step S103, and performs division into regions. For example, the division into regions may include: division into two types, for example, $R_{a1}$ in the case in which the horizontal component of an edge is large and $R_{a2}$ in the case in which the vertical component of the edge is large; and division into three types that also uses the size of an edge as a factor for the determination, for example, $R_{b1}$ in the case in which the size of an edge is less than a threshold value T and thus it is considered that there is no edge, $R_{b2}$ in the case in which the size of an edge is greater than or equal to the threshold value T and the horizontal component is large, and $R_{b3}$ in the case in which the size of an edge is greater than or equal to the threshold value T and the vertical component is large. The number of the divided regions can be set to any number in accordance with the definition of an edge.

The details of the above edge calculation process and the region number allocation process will be describe later using FIGS. 3 to 12B.

Subsequently, in step S105, the filter coefficient optimizing unit 131 optimizes the interpolation filter coefficients for each of the regions based on the result of the division into regions in step S104. First, in order to derive interpolation filter coefficients in the horizontal direction, interpolation filter coefficients for each fractional-accuracy pixel in the horizontal direction are optimized using Equation (3), which is a prediction error energy function.

[Equation 3]

$$E_h(\alpha_n)^2 = \sum_{(x,y)\in\alpha_n} \left(S_{x,y} - \sum_{ci} w_{ci} \cdot P_{\tilde{x}+c_i,\tilde{y}}\right)^2 \quad (3)$$

Here, $\alpha_n$ denotes each region, n denotes a region number, S denotes an original picture, P denotes a decoded reference picture, and x and y respective denote the positions in the horizontal direction and the vertical direction in a picture. In addition, ~x (~ denotes a symbol placed above x) satisfies ~x=x+$MV_x$−FilterOffset, where $MV_x$ denotes the horizontal component of a motion vector obtained in advance, and FilterOffset denotes an offset for adjustment (the value obtained by dividing a filter length in the horizontal direction by 2). With respect to the vertical direction, ~y=y+$MV_y$ is satisfied, where $MV_y$ denotes the vertical component of the motion vector. $w_{ci}$ denotes a group of filter coefficients in the horizontal direction $c_i$ ($0 \le c_i < 6$) that is to be determined.

Figure 16A:
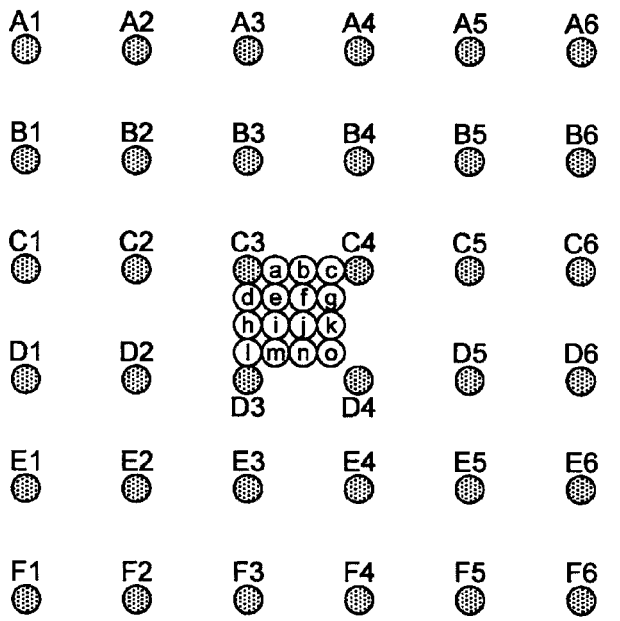
FIG. 16A is a diagram illustrating a pixel interpolation method of non-integer accuracy in a separable adaptive interpolation filter (SAIF).
Figure 16B:
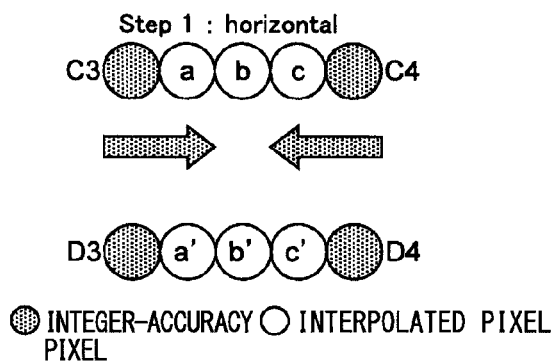
FIG. 16B is a diagram illustrating a pixel interpolation method of non-integer accuracy in a separable adaptive interpolation filter (SAIF).
Figure 16C:
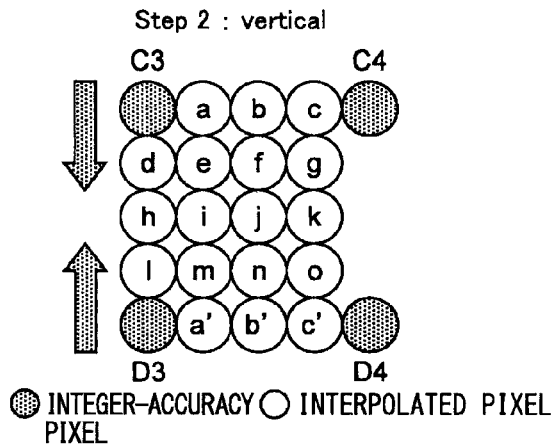
FIG. 16C is a diagram illustrating a pixel interpolation method of non-integer accuracy in a separable adaptive interpolation filter (SAIF).
Figure 17A:
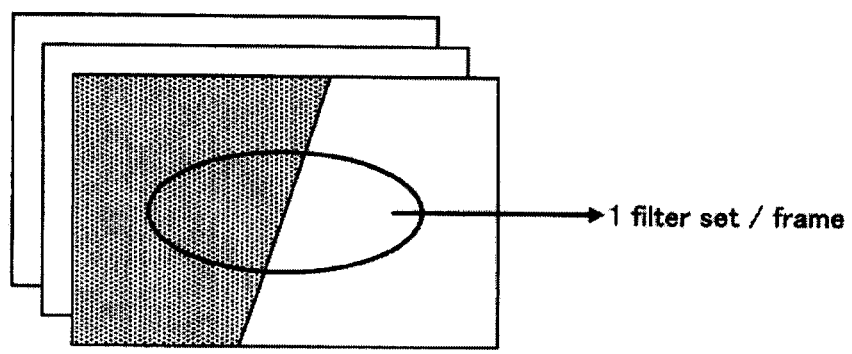
FIG. 17A is a diagram illustrating a comparison between a conventional adaptive interpolation filter and a region-dividing type adaptive interpolation filter.
Figure 17B:
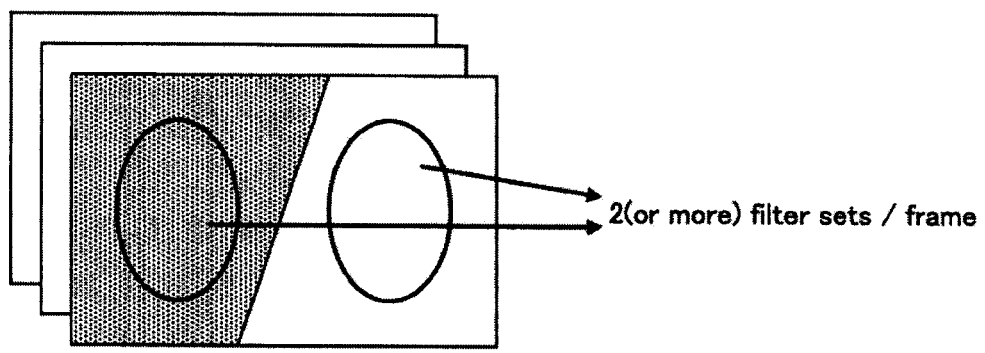
FIG. 17B is a diagram illustrating a comparison between a conventional adaptive interpolation filter and a region-dividing type adaptive interpolation filter.

Subsequently, in step S106, fractional-pixel interpolation in the horizontal direction (interpolation of a, b, and c in FIG. 16A to FIG. 16C) is performed for the regions in the frame independently of one another using the interpolation filter coefficients in the horizontal direction obtained in step S105.

Subsequently, in step S107, interpolation filter coefficients in the vertical direction are optimized. In order to derive the interpolation filter coefficients in the vertical direction, interpolation filter coefficients for each fractional pixel in the vertical direction are optimized using Equation (4), which is a prediction error energy function in the vertical direction.

[Equation 4]

$$E_v(\alpha_n)^2 = \sum_{(x,y)\in\alpha_n} \left(S_{x,y} - \sum_{cj} w_{cj} \cdot \hat{P}_{\tilde{x},\tilde{y}+c_j}\right)^2 \quad (4)$$

Here, $\alpha_n$ denotes each region, n denotes a region number, S denotes an original picture, ^P denotes a picture interpolated in the horizontal direction in step S106, and x and y respectively denote the horizontal position and the vertical direction position in a picture. In addition, ~x is represented as 4·(x+$MV_x$), where $MV_x$ denotes the horizontal component of a motion vector that has been rounded off to the nearest whole number. With respect to the vertical direction, ~y is represented as y+$MV_y$−FilterOffset, where $MV_y$ denotes the vertical component of the motion vector, and FilterOffset denotes an offset for adjustment (the value obtained by dividing a filter length by 2). $w_{cj}$ denotes a group of filter coefficients in the vertical direction $c_j$ ($0 \le c_j < 6$) that is to be determined.

Subsequently, in step S108, fractional-pixel interpolation in the vertical direction (interpolation of d to o in FIG. 16A or FIG. 16C) is performed for the regions in the frame independently of one another using the interpolation filter coefficients in the vertical direction obtained in step S107.

Subsequently, in step S109, the motion detecting unit 142 calculates a motion vector again using a picture interpolated in the vertical direction that has been obtained in step S108 as a reference picture.

Subsequently, in step S110, a rate distortion cost (RD cost) is calculated and stored.

Subsequently, in step S111, the optimum interpolation filter coefficients obtained in step S105 and step S107 are sent to the variable-length encoding unit 16, and the variable-length encoding unit 16 encodes the interpolation filter coefficients.

Subsequently, in step S112, the variable-length encoding unit 16 encodes quantized coefficient values, which are the output of the predictive encoding unit 15, motion vectors (MV), which are the output of the motion detecting unit 142, and other pieces of information to be encoded, and outputs a bitstream.

The above steps S101 to S112 are repeated until encoding of all the frames is completed, and the processing is completed when the encoding of all the frames has been completed (step S113). In the above description, a procedure has been described in which interpolation in the vertical direction is performed after interpolation in the horizontal direction is performed; however, a procedure in which interpolation in the horizontal direction is performed after interpolation in the vertical direction is performed can be processed in a similar manner.

[First Example of Edge Calculation Process]

Figure 3:
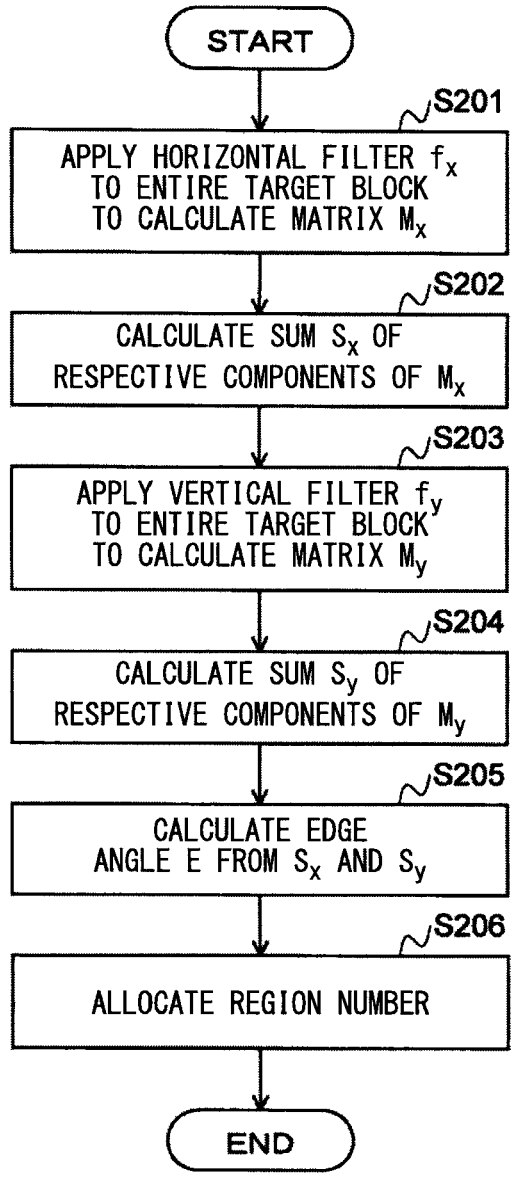
FIG. 3 is a flowchart of an edge calculation process.
Figure 4:
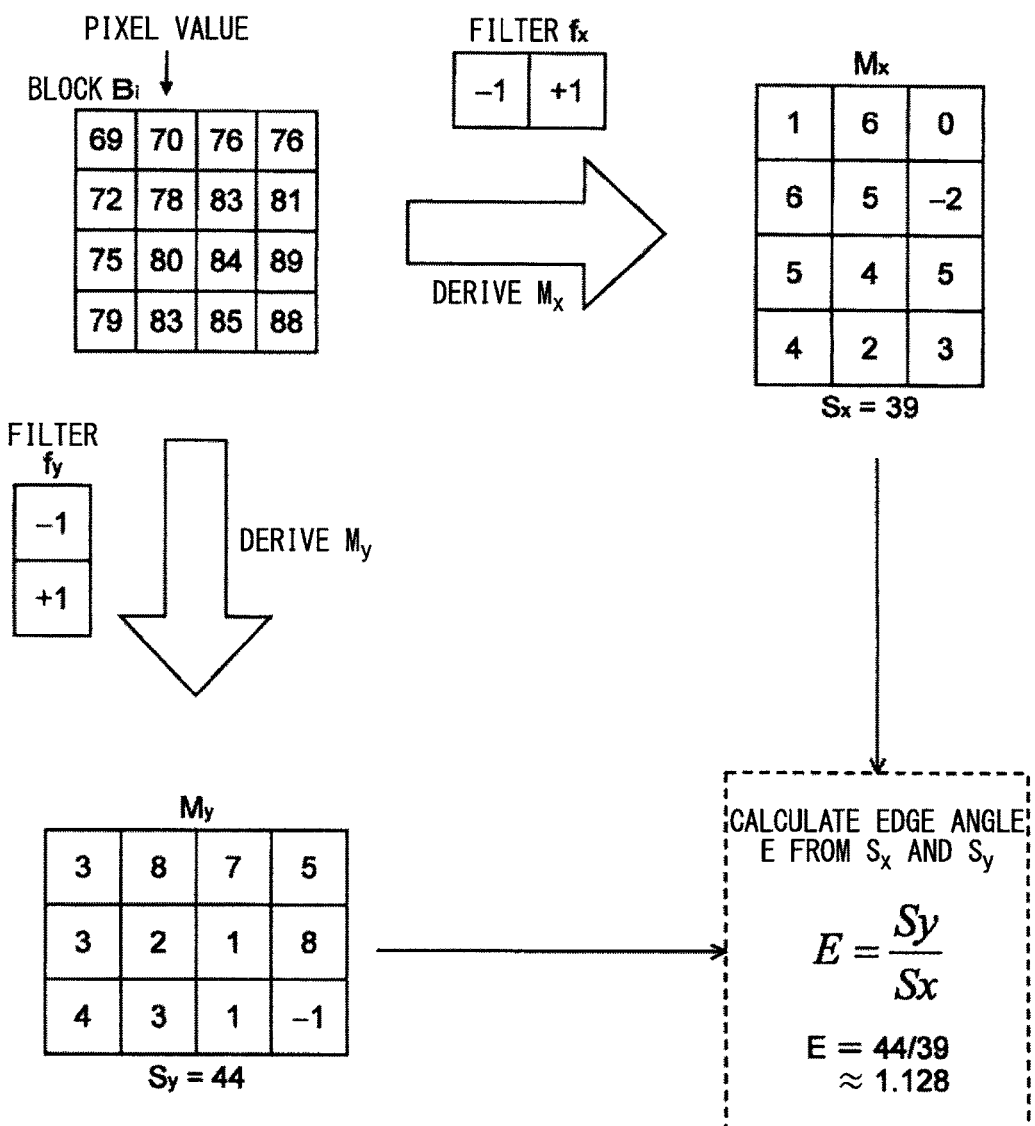
FIG. 4 is a diagram illustrating a specific example of the edge calculation process.

Next, the details of the edge calculation process will be described in accordance with FIG. 3 and FIG. 4. FIG. 3 is a flowchart of a detailed process of step S103 (edge calculation process) described with reference to FIG. 2. FIG. 4 is a diagram illustrating a specific example of the edge calculation process.

First, in step S201, a horizontal filter $f_x$ is applied to the entire target block $B_i$ to calculates a matrix $M_x$. For example, as shown in FIG. 4, the matrix $M_x$ is derived by applying the horizontal filter $f_x$, which calculates the difference between the values of pixels that are adjacent in the horizontal direction, to the block $B_i$.

In step S202, a sum $S_x$ of the respective components of the matrix $M_x$ is calculated. In the example of FIG. 4, $S_x=39$ is obtained.

Next, in step S203, a vertical filter $f_y$ is applied to the entire target block $B_i$ to calculate a matrix $M_y$. For example, as shown in FIG. 4, the matrix $M_y$ is derived by applying the vertical filter $f_y$, which calculates the difference between the values of pixels that are adjacent in the vertical direction, to the block $B_i$.

In step S204, a sum $S_y$ of the respective components of the matrix $M_y$ is calculated. In the example of FIG. 4, $S_y=44$ is obtained.

In step S205, an edge angle $E=S_y/S_x$ is calculated from $S_x$ and $S_y$. In the example of FIG. 4, $E=S_y/S_x=44/39 \approx 1.128$ is obtained.

In step S206, a region number indicating a region to which the block $B_i$ belongs is allocated to the block $B_i$ based on the edge angle calculated in step S205.

[First Example of Region Number Allocation Process]

Figure 5:
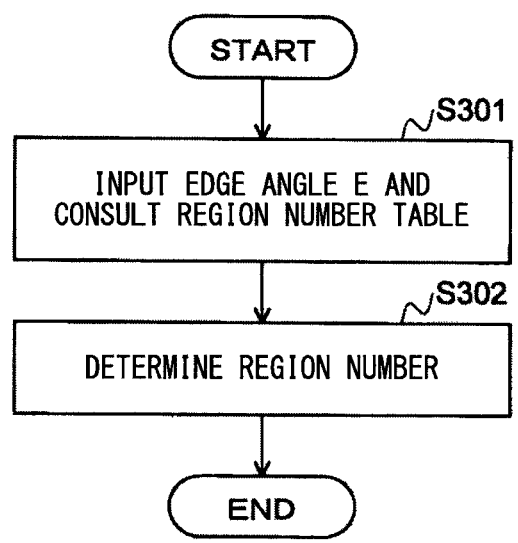
FIG. 5 is flowchart of an allocation process of a region number.

The details of an allocation process of a region number will be described in accordance with FIGS. 5 to 7B. FIG. 5 is a detailed flowchart of step S206 (region number allocation process) described with reference to FIG. 3.

In step S301, an edge angle E is input, and a region number table is consulted. In step S302, a region number is determined based on the result of the consultation to the region number table.

Figures 6A, 6B:
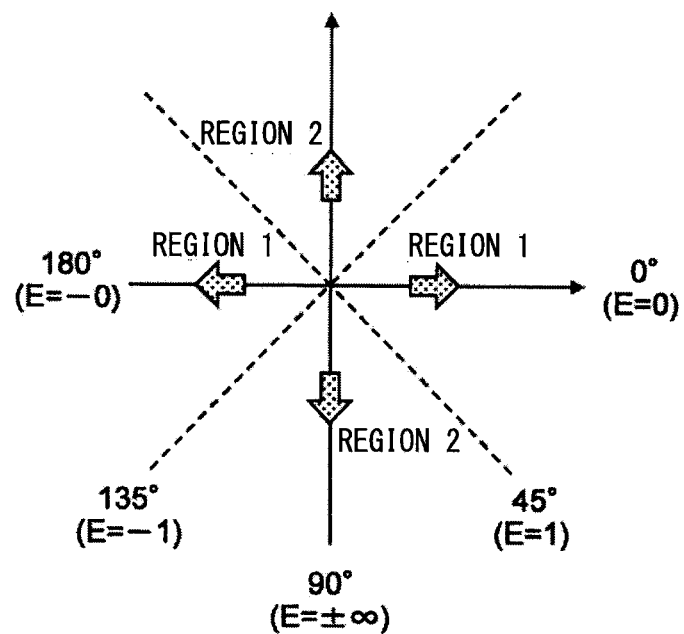
FIG. 6A is a diagram illustrating an example of a region number table when the number of regions is 2.
FIG. 6B is a diagram illustrating an example of a region number table when the number of regions is 2.

The number of regions can be set to any number, and FIG. 6B illustrates an example of a region number table when the number of regions is 2. When the number of regions is 2, as shown in FIG. 6A, "region 1" is allocated when an edge is horizontal, and "region 2" is allocated when an edge is vertical. That is, as shown in FIG. 6B, the region number table stores definition information in which the region number is 1 (region 1) when $-1 \leq E \leq 1$, and the region number is 2 (region 2) when $E<-1$ or $1<E$. Since $E \approx 1.128$ in the example of FIG. 4, the block $B_i$ is determined as "region 2".

Figures 7A, 7B:
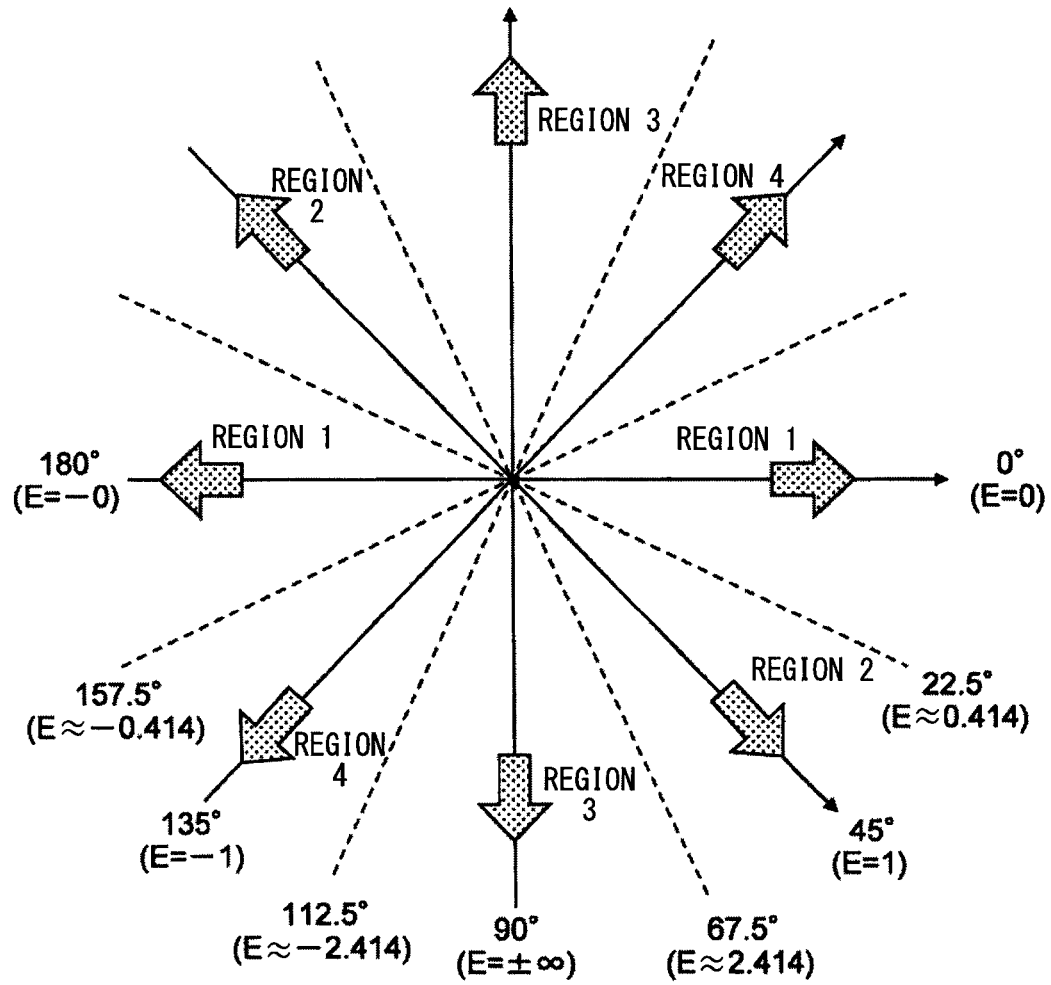
FIG. 7A is s a diagram illustrating an example of a region number table when the number of regions is 4.
FIG. 7B is s a diagram illustrating an example of a region number table when the number of regions is 4.

Similarly, FIG. 7B illustrates an example of a region number table when the number of regions is 4. When the number of regions is 4, for example, as shown in FIG. 7A, classification into four regions including "region 1", "region 2", "region 3", and "region 4" is made in accordance with the edge angle. That is, as shown in FIG. 7B, the region number table stores definition information in which the region number is 1 (region 1) when $-0.414 \leq E < 0.414$, the region number is 2 (region 2) when $0.414 \leq E < 2.414$, the region number is 3 (region 3) when $2.414 \leq E$ or $E < -2.414$, and the region number is 4 (region 4) when $-2.414 \leq E < -0.414$. Since $E \approx 1.128$ in the example of FIG. 4, the block $B_i$ is determined as "region 2".

[Second Example of Edge Calculation Process]

Figure 8:
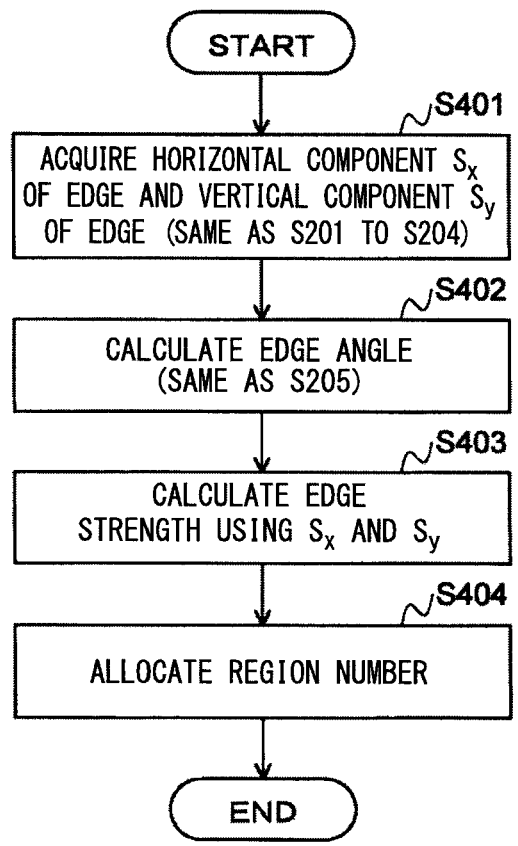
FIG. 8 is a flowchart of an edge calculation process (in which edge strength is taken into consideration) in accordance with a second example.
Figure 9:
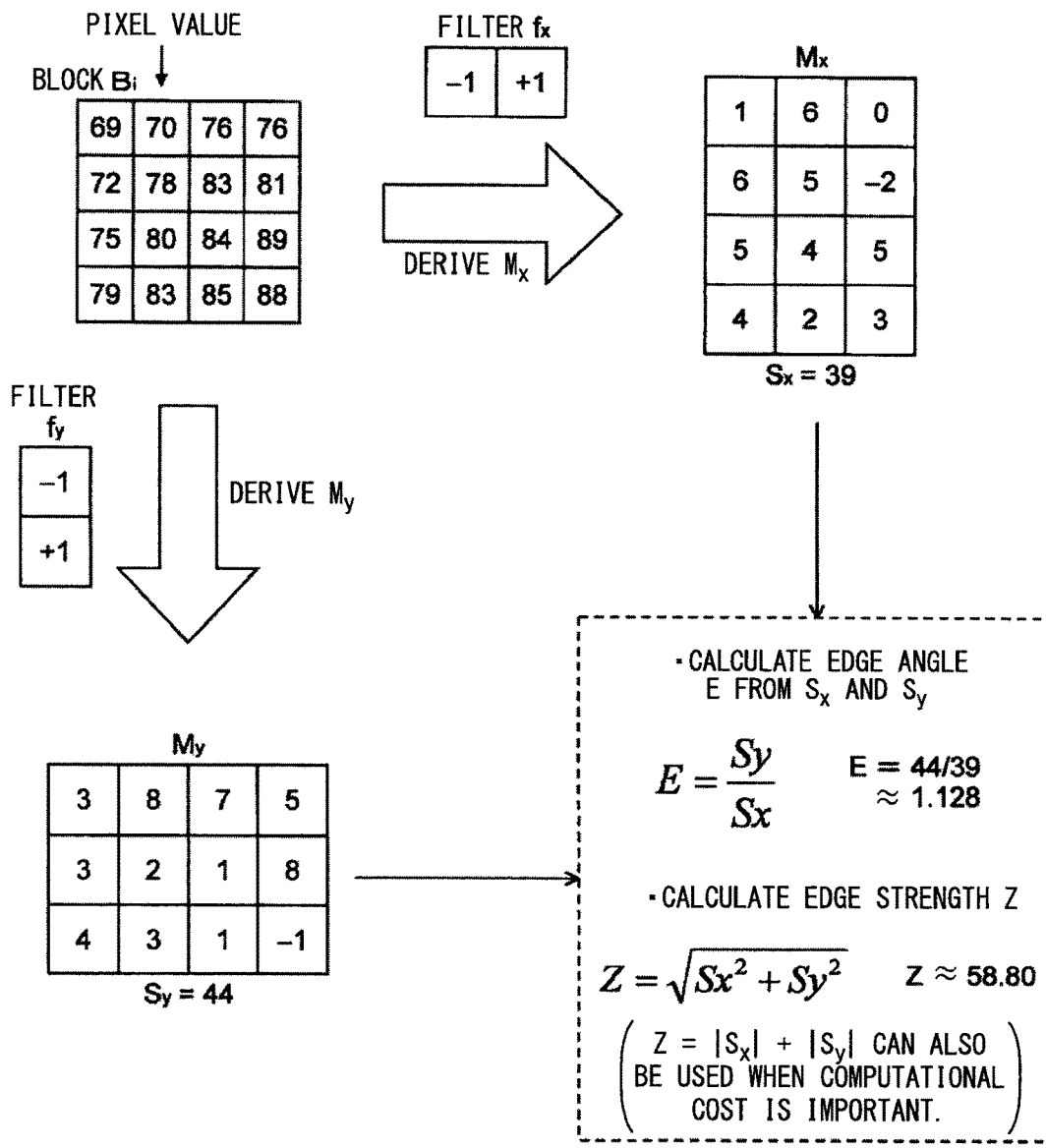
FIG. 9 is a diagram illustrating a specific example of the edge calculation process (in which edge strength is taken into consideration) in accordance with the second example.

Another example of the edge calculation process will be described. In this example, edge strength is calculated in addition to the edge angle, and a region number is allocated based on the edge angle and the edge strength. FIG. 8 is a flowchart of a second example of a detailed process of step S103 (edge calculation process) described with reference to FIG. 2. FIG. 9 is a diagram illustrating a specific example of the edge calculation process in which the edge strength is taken into consideration.

First, in step S401, the horizontal component $S_x$ of an edge and the vertical component $S_y$ of the edge are acquired by the same processes as those of the above-described steps S201 to S204 of FIG. 3. As shown in the example of FIG. 9, $S_x=39$ and $S_y=44$ are obtained.

Next, in step S402, an edge angle $E=S_y/S_x$ is calculated by the same process as that of step S205 of FIG. 3. In the example of FIG. 9, $E=S_y/S_x=44/39 \approx 1.128$ is obtained.

In step S403, an edge strength Z is calculated using the horizontal component $S_x$ of the edge and the vertical component $S_y$ of the edge calculated in step S401. The edge strength Z is calculated, for example, by the following equation.

$$Z=(S_x^2+S_y^2)^{1/2}$$

When $S_x=39$ and $S_y=44$ as in the example of FIG. 9, $Z \approx 58.80$ is obtained. It is to be noted that the definition of the edge strength is not limited to the above equation, and the edge strength may be defined by another equation. For example, when a computational cost is important, the edge strength may be defined as the sum of the absolute values of the horizontal component $S_x$ of the edge and the vertical component $S_y$ of the edge, like $Z=|S_x|+|S_y|$.

In step S404, a region number indicating a region to which the block $B_i$ belongs is allocated to the block $B_i$ based on the edge angle E calculated in step S402 and the edge strength Z calculated in step S403.

[Second Example of Region Number Allocation Process]

Figure 10:
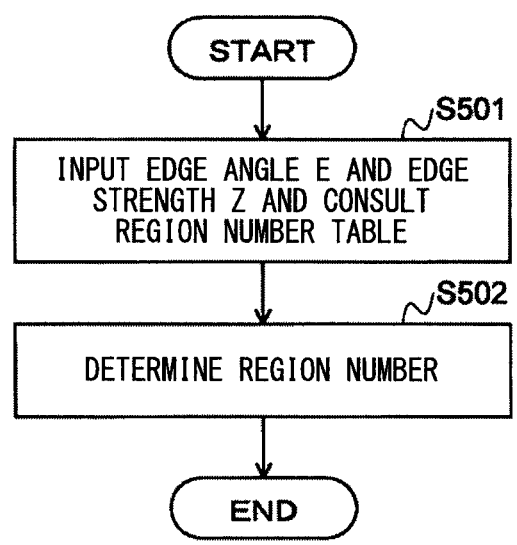
FIG. 10 is a flowchart of an allocation process of a region number in accordance with the second example.

The details of an allocation process of a region number in the second example will be described in accordance with FIGS. 10 to 12B. FIG. 10 is a detailed flowchart of step S404 (region number allocation process) described with reference to FIG. 8.

In step S501, an edge angle E and edge strength Z are input, and a region number table is consulted. In step S502, a region number is determined based on the result of the consultation to the region number table.

Figures 11A, 11B:
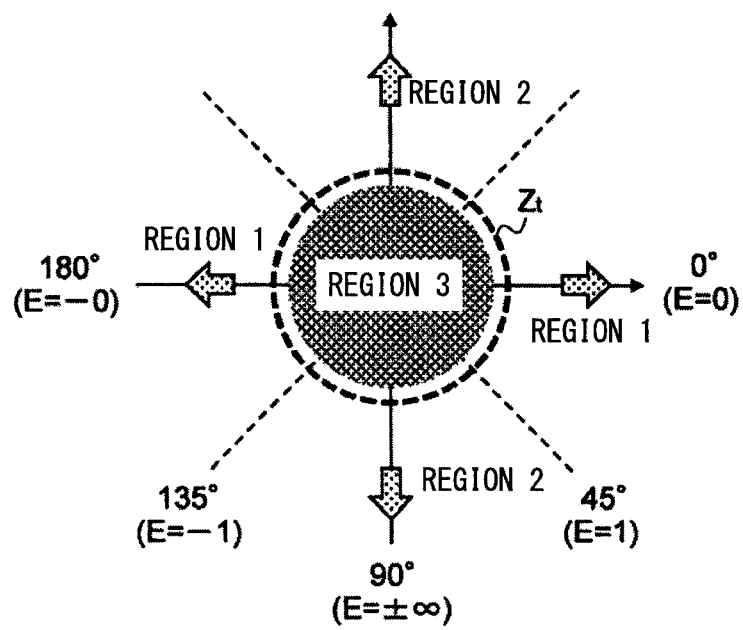
FIG. 11A is a diagram illustrating an example of a region number table when the number of regions is 3.
FIG. 11B is a diagram illustrating an example of a region number table when the number of regions is 3.

FIG. 11B illustrates an example of a region number table when the number of regions is 3. In this example, as shown in FIG. 11A, "region 1" is allocated as the region number when an edge is strong and is horizontal, "region 2" is allocated as the region number when an edge is strong and is vertical, and "region 3" is allocated as the region number when an edge is weak.

It is assumed that a threshold value for the edge strength is $Z_t$. The threshold value $Z_t$ can be set arbitrarily. As shown in FIG. 11B, the region number table stores definition information in which the region number is 1 (region 1) when $-1 \leq E < 1$ and $Z_t < Z$, the region number is 2 (region 2) when $E<-1$ or $1<E$ and $Z_t<Z$, and the region is 3 (region 3) when $Z \leq Z_t$. For example, assuming that the threshold value $Z_t$ is 30, since $E \approx 1.128$ and $Z=58.80$ in the example of FIG. 9, the block $B_i$ is determined as "region 2".

Figures 12A, 12B:
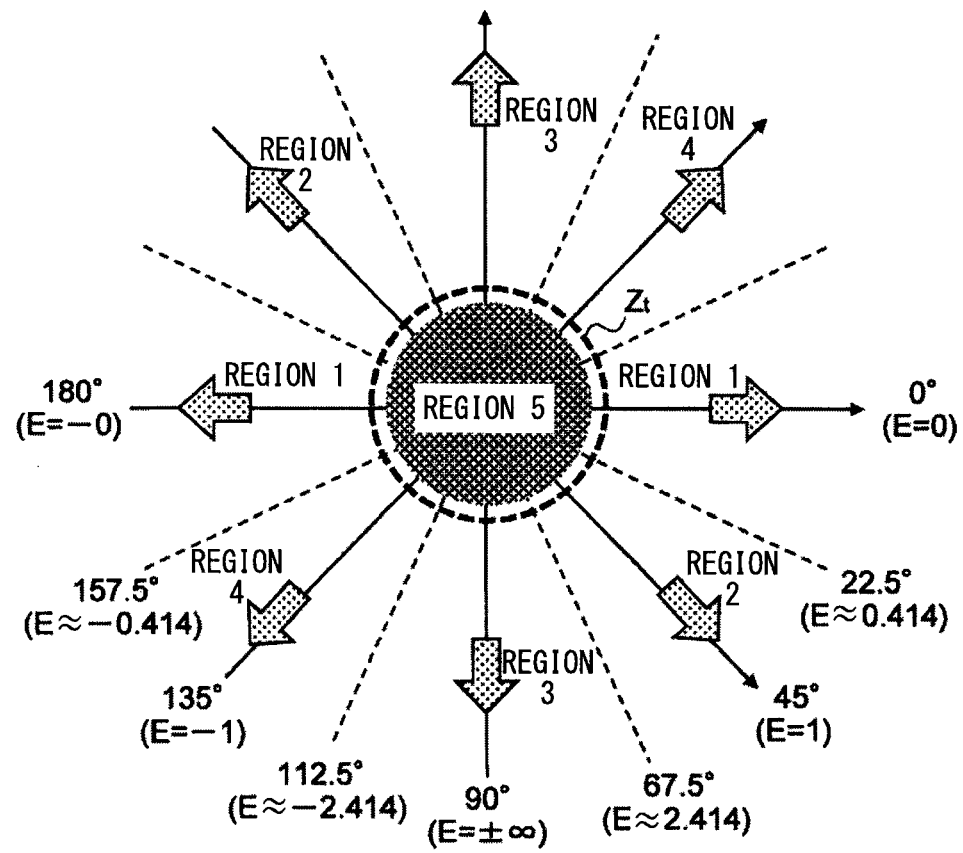
FIG. 12A is a diagram illustrating an example of a region number table when the number of regions is 5.
FIG. 12B is a diagram illustrating an example of a region number table when the number of regions is 5.

Similarly, FIG. 12B illustrates an example of a region number table when the number of regions is 5. In this example, for example, as shown in FIG. 12A, classification into four regions including "region 1", "region 2", "region 3", and "region 4" is made in accordance with the edge angle when an edge is strong, and classification as "region 5" is made when an edge is weak. That is, as shown in FIG. 12B, the region number table stores definition information in which the region number is 1 (region 1) when $-0.414 \leq E<0.414$ and $Z_t<Z$, the region number is 2 (region 2) when $0.414 \leq E<2.414$ and $Z_t<Z$, the region number is 3 (region 3) when $2.414 \leq E$ or $E<-2.414$ and $Z_t<Z$, the region number is 4 (region 4) when $-2.414 \leq E<-0.414$ and $Z_t<Z$, and the region number is 5 (region 5) when $Z \leq Z_t$. For example, assuming that the threshold value $Z_t$ is 30, since $E \approx 1.128$ and $Z=58.80$ in the example of FIG. 9, the block $B_i$ is determined as "region 2".

Although a description in which the threshold value $Z_t$ for the edge strength can be set arbitrarily has been given here, when the video encoding apparatus 10 determines it in accordance with features or encoding conditions of a picture, the threshold value $Z_t$ may be encoded, included in an encoded bitstream, and transmitted to the video decoding apparatus. In addition, the threshold value $Z_t$ may be determined based on a decoded picture obtained by decoding an already encoded picture; in this case, since the video decoding apparatus can calculate the threshold value $Z_t$ from the decoded picture, it is not necessary to encode and transmit the threshold value $Z_t$. For example, a threshold value $Z_t$ used for encoding the tenth frame is set to the average value of edge strengths for all the blocks in pictures of the first frame to the ninth frame, which have already been encoded and then decoded. Alternatively, taking the balance in division into regions into consideration, the threshold value $Z_t$ may be determined in accordance with the number of regions such that the threshold value $Z_t$ is set to ⅔ times the average value of the previous edge strengths when the number of regions is 3, and the threshold value $Z_t$ is set to ⅖ times the average value of the previous edge strengths when the number of regions is 5.

[Video Decoding Apparatus]

Figure 13:
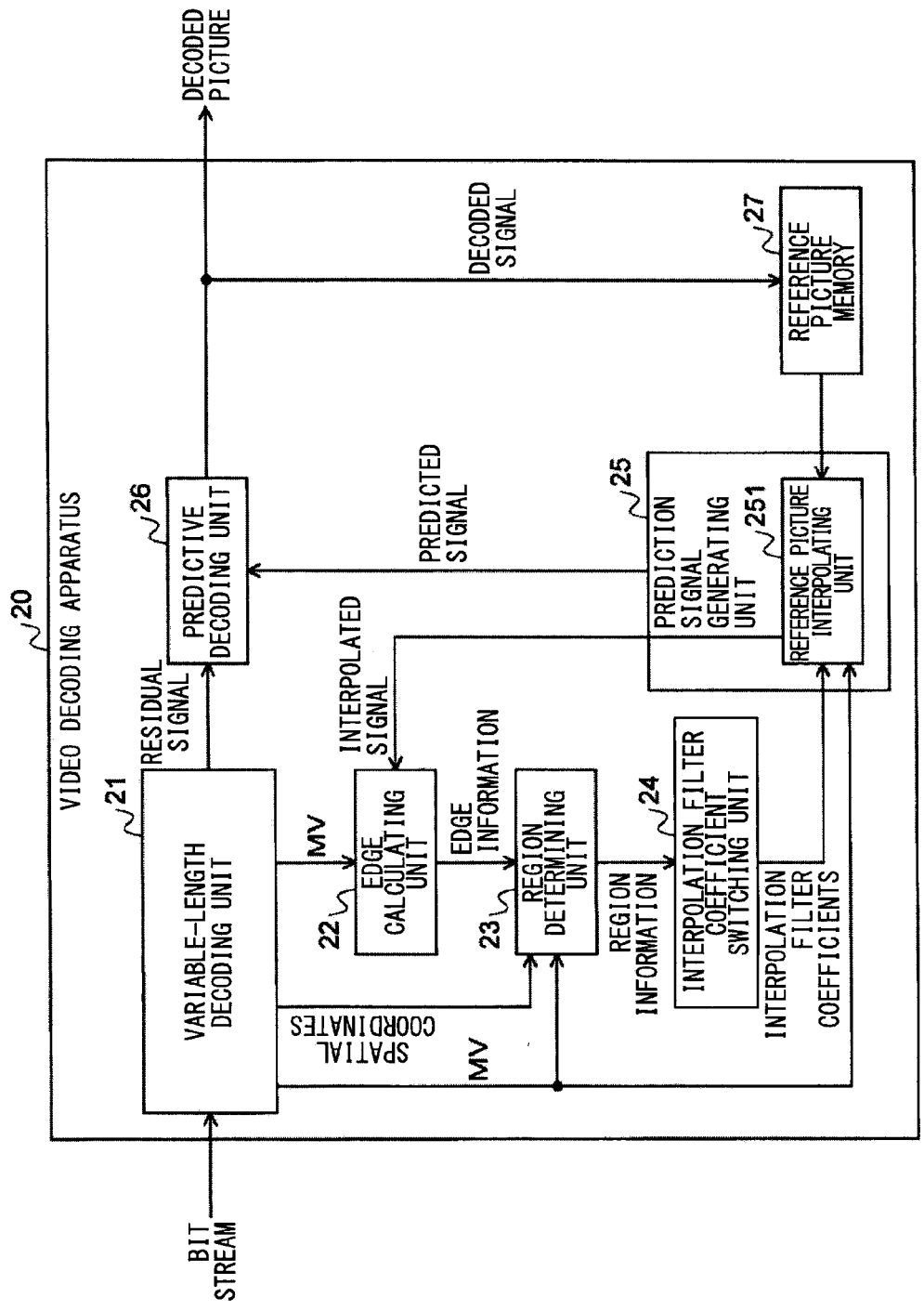
FIG. 13 is a diagram illustrating an example of a configuration of a video decoding apparatus.
Figure 19:
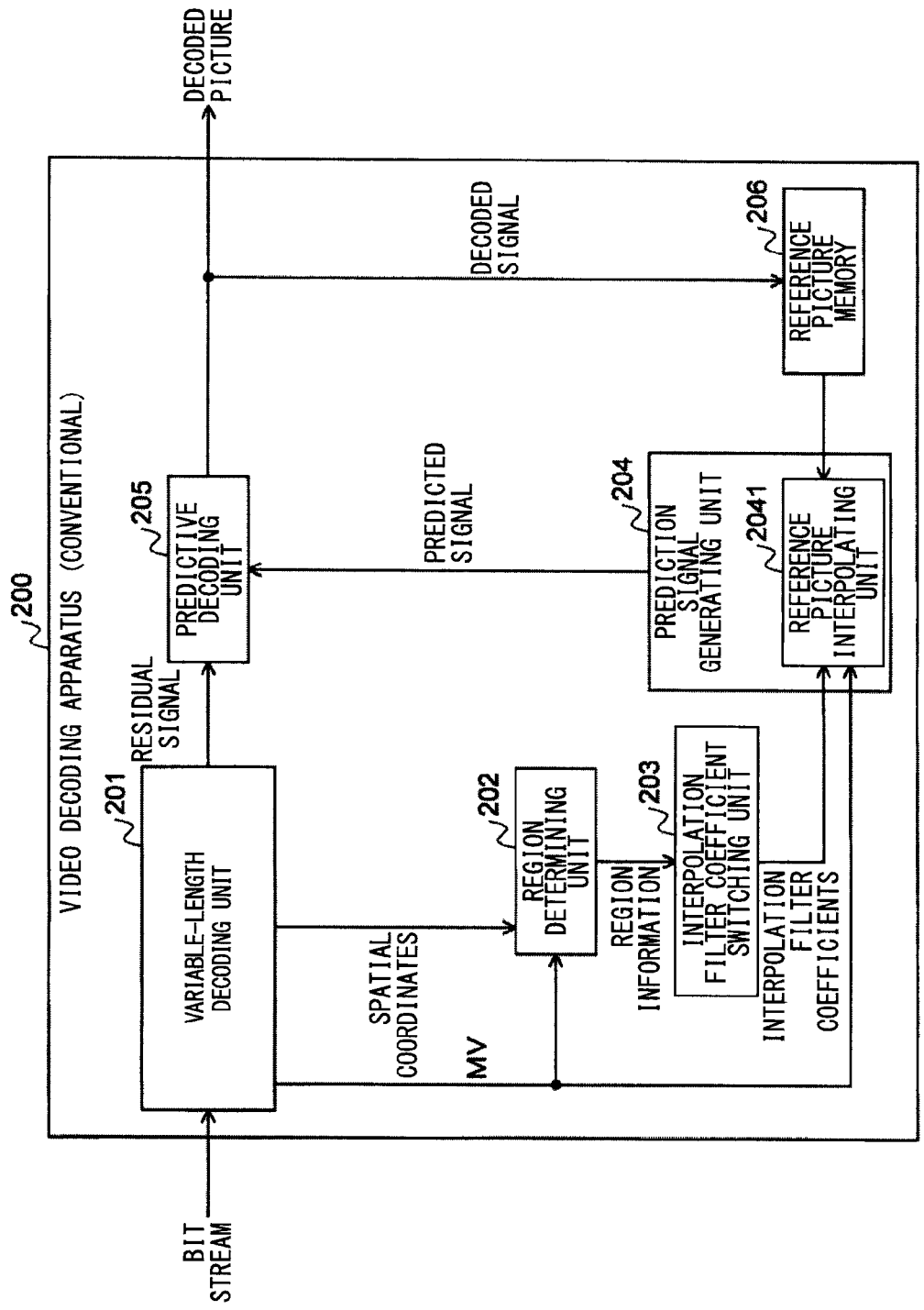
FIG. 19 is a diagram illustrating an example of a configuration of a video decoding apparatus using a conventional region-dividing type adaptive interpolation filter.

FIG. 13 is a diagram illustrating an example of a configuration of a video decoding apparatus in accordance with the present invention. A video decoding apparatus 20 inputs a bitstream encoded by the video encoding apparatus 10 shown in FIG. 1, interpolates fractional-accuracy pixels using a region-dividing type adaptive interpolation filter that utilizes edge information, and performs decoding with motion compensation of fractional-accuracy. It differs from the conventional video decoding apparatus 200 shown in FIG. 19 in that a region is determined using edge information detected from a reference picture, an adaptive interpolation filter is switched, and fractional-accuracy pixels are interpolated.

In the video decoding apparatus 20, a variable-length decoding unit 21 inputs the encoded bitstream, and decodes quantized transform coefficients, a motion vector, groups of interpolation filter coefficients, and the like. An edge calculating unit 22 extracts edge information, for example, an edge angle, or an edge angle and edge strength, from a reference picture in motion compensation. A region determining unit 23 determines regions which are units for adaptively switching interpolation filter coefficients for a decoding target frame using the edge information calculated by the edge calculating unit 22. An interpolation filter coefficient switching unit 24 switches the interpolation filter coefficients decoded by the variable-length decoding unit 21 for each of the regions determined by the region determining unit 23.

A reference picture interpolating unit 251 in a prediction signal generating unit 25 apples an interpolation filter using interpolation filter coefficients received from the interpolation filter coefficient switching unit 24 to a decoded reference picture stored in a reference picture memory 27 to restore fractional-accuracy pixels of the reference picture. The prediction signal generating unit 25 generates a predicted signal of a decoding target block from the reference picture for which the fractional-accuracy pixels have been restored.

A predictive decoding unit 26 performs inverse quantization of the quantization coefficients decoded by the variable-length decoding unit 21, inverse orthogonal transform, and the like, sums the calculated prediction error signal and the predicted signal generated by the prediction signal generating unit 25 to generate a decode signal, and outputs it as a decoded picture. In addition, the decoded signal decoded by the predictive decoding unit 26 is stored in the reference picture memory 27 for the subsequent predictive decoding.

[Processing Flow of Video Decoding Apparatus]

Figure 14:
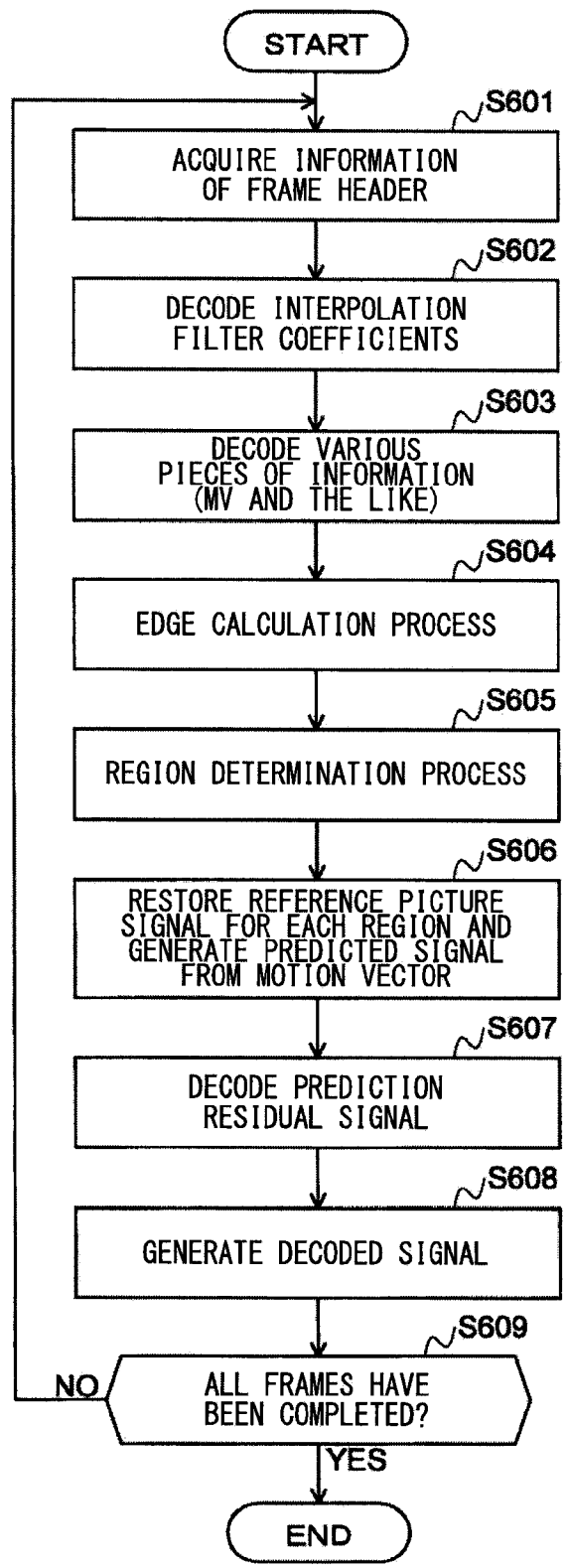
FIG. 14 is a flowchart of a video decoding process.
Figure 15A:
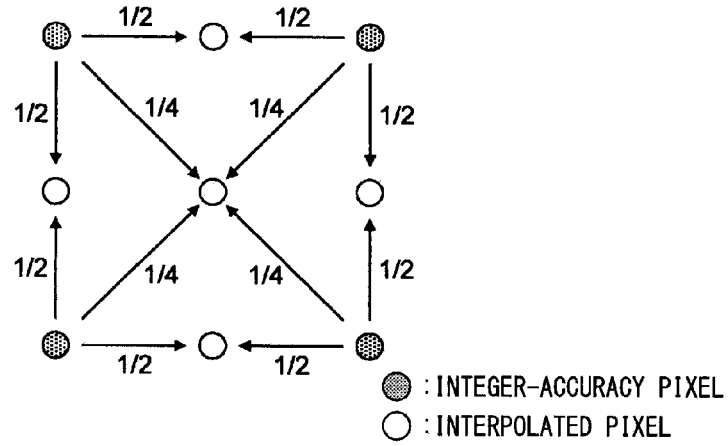
FIG. 15A is a diagram illustrating a pixel interpolation method of non-integer accuracy in conventional video encoding standards.
Figure 15B:
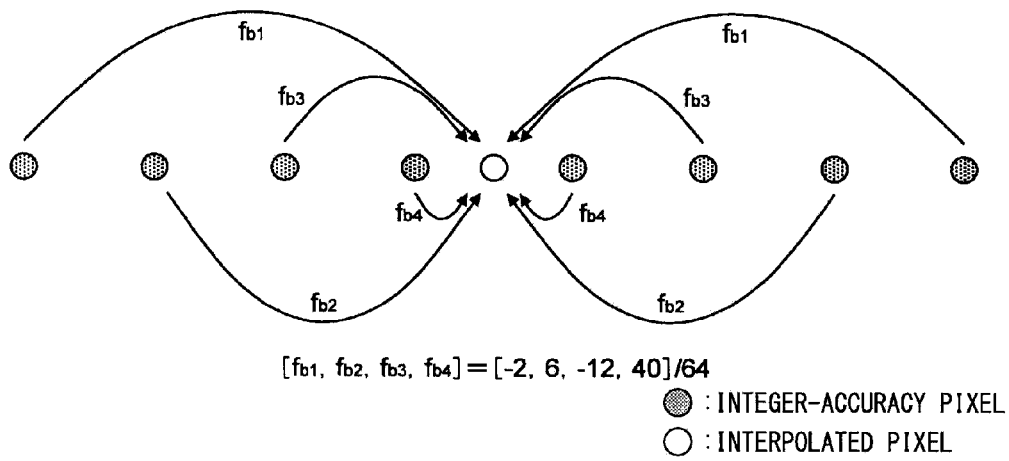
FIG. 15B is a diagram illustrating a pixel interpolation method of non-integer accuracy in conventional video encoding standards.
Figure 15C:
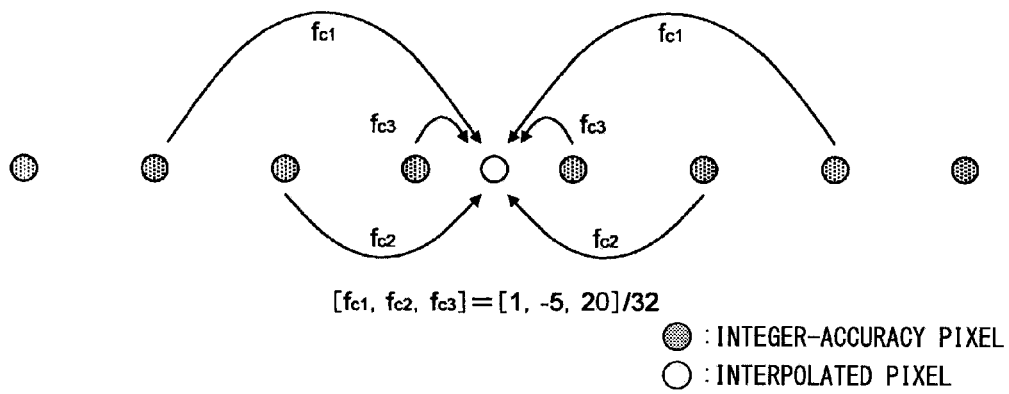
FIG. 15C is a diagram illustrating a pixel interpolation method of non-integer accuracy in conventional video encoding standards.

FIG. 14 is a flowchart of a video decoding process executed by the video decoding apparatus 20. Hereinafter, unless otherwise specified, a description will be given assuming that luminance signals are processed; however, it can be applied not only to luminance signals but also to chrominance signals.

First, in step S601, the variable-length decoding unit 21 acquires information of a frame header from an input bitstream. Next, in step S602, interpolation filter coefficients used for each region are decoded. In step S603, various pieces of information, such as a motion vector (MV), are decoded. The decoding of the various pieces of information in step S603 is similar to decoding processes in conventional typical video decoding apparatuses.

Subsequently, in step S604, the edge calculating unit 22 acquires a reference picture using the motion vector decoded in step S603, and calculates edge information from the reference picture. The calculation of the edge information is the same as the edge calculation process described with reference to FIG. 3 or FIG. 8.

Subsequently, in step S605, the region determining unit 23 determines a region to which a decoding target block belongs based on the edge information obtained in step S604 for each block, and acquires region information (region number).

Subsequently, in step S606, the interpolation filter coefficient switching unit 24 selects the optimum interpolation filter coefficients decoded in step S602 based on the region number obtained in step S605, the reference picture interpolating unit 251 restores fractional-accuracy pixels of the reference picture, and, after the restoration of the fractional-accuracy pixels, the prediction signal generating unit 25 generates a predicted signal of the decoding target block using the motion vector decoded in step S603.

Subsequently, in step S607, the variable-length decoding unit 21 decodes a prediction residual signal of the decoding target block from the input bitstream.

Subsequently, in step S608, the predictive decoding unit 26 sums the predicted signal obtained in step S606 and the prediction residual signal obtained in step S607 to generate a decoded signal. The generated decoded signal is output as a decoded picture and is stored in the reference picture memory 27.

The above steps S601 to S608 are repeated until decoding of all the frames is completed, and the processing is completed when the decoding of all the frames has been completed (step S609). In the above description, a procedure has been described in which interpolation in the vertical direction is performed after interpolation in the horizontal direction is performed; however, a procedure in which interpolation in the horizontal direction is performed after interpolation in the vertical direction is performed can be processed in a similar manner.

The above video encoding and video decoding processes may also be realized using a computer and a software program, the program may be recorded in a computer-readable recoding medium, and the program may be provided through a network.

As described above, embodiments of the present invention have been described in detail with reference to the drawings; however, the specific configuration is not limited to these embodiments, and designs and the like (addition, omission, replacement, and other modifications of the configuration) without departing from the gist of the present invention are also included. The present invention is not limited by the aforementioned description, and is only limited by the enclosed claims.

INDUSTRIAL APPLICABILITY

The present invention can be used, for example, in video encoding and video decoding using motion compensation. The present invention can realize division into regions using texture (edge) information, which was not able to be taken into consideration in conventional separable adaptive interpolation filters, provide a wide variety of types of division into regions, increase the flexibility in terms of locality within a frame, and achieve improvement in encoding efficiency as a result of a reduction in prediction error energy.

DESCRIPTION OF REFERENCE NUMERALS

10 video encoding apparatus
11 region dividing unit
12 edge calculating unit
13 interpolation filter coefficient switching unit
131 filter coefficient optimizing unit
14 prediction signal generating unit 141 reference picture interpolating unit
142 motion detecting unit
15 predictive encoding unit
16 variable-length encoding unit
17 decoding unit
18 reference picture memory
20 video decoding apparatus
21 variable-length decoding unit
22 edge calculating unit
23 region determining unit
24 interpolation filter coefficient switching unit
25 prediction signal generating unit
251 reference picture interpolating unit
26 predictive decoding unit
27 reference picture memory

The invention claimed is:

1. A video encoding method using motion compensation of fractional-accuracy, the method comprising:
a step of acquiring reference picture data designated by a motion vector and calculating edge information from the acquired reference picture data;
a step of performing division of an encoding target frame into a plurality of regions that are units to which interpolation filters are adaptively applied, based on the edge information;
a step of optimizing an interpolation filter for a fractional-accuracy pixel for each of the regions; and
a step of interpolating the fractional-accuracy pixel of a reference picture using the optimized interpolation filter and performing predictive encoding using the motion compensation of fractional-accuracy,
wherein the edge information is an edge angle extracted from the reference picture data designated by the motion vector and edge strength, and
the division into the regions is performed depending on (a) whether or not the edge strength is higher than a threshold value and (b) if the edge strength is higher than the threshold value, a range of angles to which the edge angle belongs,
the video encoding method further comprises a determining step of determining the threshold value based on a decoded picture obtained by performing decoding on an already encoded picture, and
the determining step determines the threshold value in accordance with the number of the regions and an average value of previous edge strengths.

2. A non-transitory compute readable medium storing a video encoding program which causes a computer to execute the video encoding method according to claim 1.

3. A video decoding method using motion compensation of fractional-accuracy, the method comprising:
a step of decoding interpolation filter coefficients for a fractional-accuracy pixel;
a step of calculating edge information from reference picture data obtained from a decoded motion vector;
a step of determining a region to which decoding target data belongs among a plurality of regions which are units to which interpolation filters are adaptively applied, using the edge information; and
a step of switching an interpolation filter for the fractional-accuracy pixel for each of the regions, interpolating the fractional-accuracy pixel of a reference picture, and performing predictive decoding using the motion compensation of fractional-accuracy,
wherein the edge information is an edge angle extracted from the reference picture data designated by the motion vector and edge strength, and the regions are determined depending on (a) whether or not the edge strength is higher than a threshold value and (b) if the edge strength is higher than the threshold value, a range of angles to which the edge angle belongs,
the video decoding method further comprises a determining step of determining the threshold value based on a decoded picture obtained by decoding an already encoded picture, and
the determining step determines the threshold value in accordance with the number of the regions and an average value of previous edge strengths.

4. A non-transitory computer readable medium storing a video decoding program which causes a computer to execute the video decoding method according to claim 3.

5. A video encoding apparatus using motion compensation of fractional-accuracy, the apparatus comprising:
an edge calculation unit which acquires reference picture data designated by a motion vector and calculates edge information from the acquired reference picture data;
a region dividing unit which performs division of an encoding target frame into a plurality of regions that are units to which interpolation filters are adaptively applied, based on the edge information;
a filter coefficient optimizing unit which optimizes an interpolation filter for a fractional-accuracy pixel for each of the regions;
a reference picture interpolating unit which interpolates the fractional-accuracy pixel of a reference picture using the optimized interpolation filter; and
a predictive encoding unit which performs predictive encoding using the motion compensation of fractional-accuracy,
wherein the edge information is an edge angle extracted from the reference picture data designated by the motion vector and edge strength, and the division into the regions is performed depending on (a) whether or not the edge strength is higher than a threshold value and (b) if the edge strength is higher than the threshold value, a range of angles to which the edge angle belongs,
the video encoding apparatus further comprises a determining unit which determines the threshold value based on a decoded picture obtained by performing decoding on an already encoded picture, and
the determining unit determines the threshold value in accordance with the number of the regions and an average value of previous edge strengths.

6. A video decoding apparatus using motion compensation of fractional-accuracy, the apparatus comprising:
an interpolation filter coefficient decoding unit which decodes interpolation filter coefficients for a fractional-accuracy pixel;
an edge calculation unit which calculates edge information from reference picture data obtained from a decoded motion vector;
a region determining unit which determines a region to which decoding target data belongs among a plurality of regions which are units to which interpolation filters are adaptively applied, using the edge information;
a reference picture interpolating unit which switches an interpolation filter for the fractional-accuracy pixel for each of the regions and interpolates the fractional-accuracy pixel of a reference picture; and
a predictive decoding unit which performs predictive decoding using the motion compensation of fractional-accuracy, wherein the edge information is an edge angle extracted from the reference picture data designated by the motion vector and edge strength, and the regions are determined depending on (a) whether or not the edge strength is higher than a threshold value and (b) if the edge strength is higher than the threshold value, a range of angles to which the edge angle belongs, the video decoding apparatus further comprises a determining unit which determines the threshold value based on a decoded picture obtained by decoding an already encoded picture, and the determining unit determines the threshold value in accordance with the number of the regions and an average value of previous edge strengths.

* * * * *